United States Patent
Seo et al.

(10) Patent No.: US 7,359,688 B2
(45) Date of Patent: Apr. 15, 2008

(54) DEVICE AND METHOD FOR DISPLAYING A STATUS OF A PORTABLE TERMINAL BY USING A CHARACTER IMAGE

(75) Inventors: Jeong-Wook Seo, Daegu (KR); Hwan Kim, Gumi-si (KR); Jae-Ho Kim, Gumi-si (KR); Wei-Jin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 11/111,979

(22) Filed: Apr. 22, 2005

(65) Prior Publication Data

US 2005/0261032 A1 Nov. 24, 2005

(30) Foreign Application Priority Data

Apr. 23, 2004 (KR) .................. 10-2004-0028411
Jul. 6, 2004 (KR) .................. 10-2004-0052407

(51) Int. Cl.
*H04M 3/00* (2006.01)
(52) U.S. Cl. ...................... 455/218; 455/566
(58) Field of Classification Search ............ 455/333, 455/418, 566; 257/700; 709/206
See application file for complete search history.

(56) References Cited

U.S. PATENT DOCUMENTS

| 6,302,789 B2 * | 10/2001 | Harada et al. ............ 463/7 |
| 2002/0028704 A1 * | 3/2002 | Bloomfield et al. ........ 463/1 |
| 2002/0095467 A1 * | 7/2002 | Hachiya et al. .......... 709/206 |
| 2005/0190188 A1 * | 9/2005 | Anzawa et al. .......... 345/474 |

* cited by examiner

*Primary Examiner*—Duc M. Nguyen
*Assistant Examiner*—Eric J Elcenko
(74) *Attorney, Agent, or Firm*—Roylance, Abrams, Berdo & Goodman, L.L.P.

(57) ABSTRACT

Disclosed are an apparatus and a method capable of expressing use state of a portable terminal by using a character image. The apparatus includes an emotion value memory for storing emotion variance values allocated to events occurring in the portable terminal in order to express an emotion of the portable terminal, a character memory for storing character images which express emotion states of the portable terminal, a controller for confirming an event variance value corresponding to an event when the event occurs in the portable terminal, changing an emotion value of the portable terminal by using the event variance value, confirming an emotion state corresponding to the emotion value, and selecting a character image corresponding to the confirmed emotional state from the character memory; and a display unit for displaying the selected character image as the emotional state of the portable terminal.

42 Claims, 26 Drawing Sheets

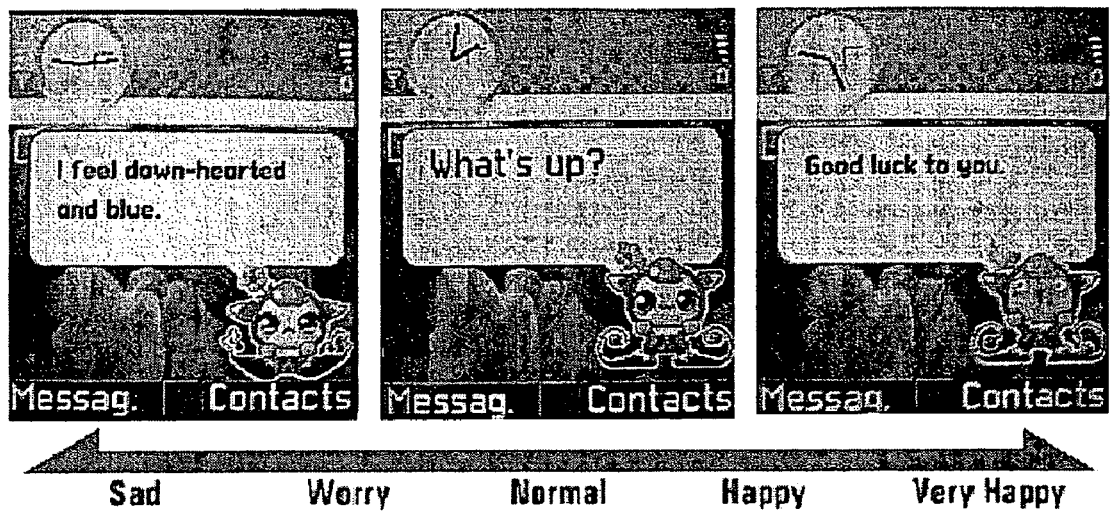
FIG.11A
 
FIG.11B  FIG.11C

DEVICE AND METHOD FOR DISPLAYING A STATUS OF A PORTABLE TERMINAL BY USING A CHARACTER IMAGE

PRIORITY

This application claims the benefit under 35 U.S.C. 119(a) of applications entitled "Device and Method for Displaying Status of Portable Terminal by Using Character Image" filed in the Korean Industrial Property Office on Apr. 23, 2004 and assigned Serial No. 2004-28411, and on Jul. 6, 2004 and assigned Serial No. 2004-52407, the entire contents of which are hereby incorporated by reference.

BACKGROUND OF THE INVENTION

1. Field of the Invention

The present invention relates to a method for displaying a status of a portable terminal. More particularly, the present invention relates to a device and a method for displaying a status of a portable terminal by using character images.

2. Description of the Related Art

Recently, portable terminals have become equipped with various functions in addition to a simple telephone function, and such additional functions enable portable terminals to process a wider variety of operations comprising communication, system reporting, messages, multimedia data, user settings, and display operations which have not been confirmed yet or have not yet been developed. For example, communication functions may be call events in relation to termination and origination of a call. Further, system reporting functions may comprise the status of a portable terminal, which represent battery deficiency, entry into communication-unavailable region, prompt menus for system setting, and so on.

Currently, it is typical to display a text message on a display unit or indicate information by using a speaker and an indicating element, in order to report the status of the portable terminal as described above. In addition, the current mobile terminals can display the status or occurrence of an event in various ways. That is, the current mobile terminals can effectively report the occurrence of an event to the user through a display unit or a voice converter.

Recently, portable terminals have become equipped with various functions in addition to a standard telephone function. One of such various additional functions is a photographing function using a camera attached to a portable terminal. A user can obtain image data by using the camera and can edit and transmit the image data. That is, portable terminals have been developed into complex portable terminals capable of performing visual expression in addition to the original communication function. Functions of such complex portable terminals include a function of expressing an operation or a status of a portable terminal by using avatars. Also, it is popular for portable terminals to employ functions of expressing the statuses of the portable terminals by using avatars. Here, the avatars can visually express the statuses of portable terminals according to occurrence of events.

SUMMARY OF THE INVENTION

Accordingly, the present invention has been made to solve the above-mentioned problems occurring in the prior art, and an object of the present invention is to provide an apparatus and a method capable of expressing a state of use of a portable terminal by using a character image.

It is another object of the present invention to provide an apparatus and a method capable of expressing an emotional state of a portable terminal by using a character image which is determined based on accumulated use factors of the portable terminal.

It is another object of the present invention to provide an apparatus and a method in which emotion variance values are allocated to use factors of a portable terminal, an emotion value of the portable terminal is determined in consideration of the emotion variance values according to the use factors and is then revised by using a biorhythm of the character, and the use environment of the portable terminal is expressed as the emotion of the character.

It is another object of the present invention to provide an apparatus and a method in which use factors of a portable terminal are classified based on emotion values of sense, popularity and intelligence, each kind of emotion values are accumulated according to occurrence of the use factors, an action model corresponding to the accumulated emotion values is activated and displayed.

It is another object of the present invention to provide an apparatus and a method in which use factors of a portable terminal are converted to and accumulated as emotion values of a character, an avatar action model and text are determined based on an analysis of a difference between a current emotion value and a previous emotion value, and the determined avatar action model and text are then displayed in order to show the emotional state of the portable terminal.

It is another object of the present invention to provide an apparatus and a method for displaying the operation state of a portable terminal by using an avatar, in which the portable terminal includes at least two character image sets, use factors of the portable terminal are converted to and accumulated as emotion values of a character, and a new character image set is displayed instead of a previous set to express the operation state of the portable terminal when one of the accumulated emotion values exceeds a preset value.

It is another object of the present invention to provide an apparatus and a method for displaying the operation state of a portable terminal by using an avatar, in which the portable terminal includes at least two character image sets, use factors of the portable terminal are allocated emotion values which are accumulated according to use of the portable terminal, and a new character image set is displayed instead of a previous set to express the operation state of the portable terminal when one of the accumulated emotion values exceeds a preset value.

It is another object of the present invention to provide an apparatus and a method for displaying the operation state of a portable terminal by using an avatar, in which the portable terminal includes at least two character image sets, use factors of the portable terminal are allocated emotion values, the emotion values are confirmed according to use of the portable terminal and are revised by using a biorhythm of the avatar, and a new character image set is displayed instead of a previous set to express the operation state of the portable terminal when one of the accumulated emotion values exceeds a preset value.

BRIEF DESCRIPTION OF THE DRAWINGS

The above and other objects, features and advantages of the present invention will be more apparent from the following detailed description taken in conjunction with the accompanying drawings, in which:

FIGS. 11A through 11F illustrate examples of five emotion states of the avatar displayed on a screen of the display unit 140 at the time point for expressing the emotion state of the avatar according to an embodiment of the present invention;

Throughout the drawings, the same elements are designated by the same reference numerals.

DETAILED DESCRIPTION OF EXEMPLARY EMBODIMENTS

Hereinafter, embodiments of the present invention will be described with reference to the accompanying drawings.

In the following description, examples for expressing emotional states of a portable terminal according to an embodiment of the present invention, such as emotion values, biorhythm values, avatar action models, texts expressed together with the avatar action models, emotion values for level change, and time points for expression of emotion, are used in order to provide an understanding of the present invention. However, it should be apparent to those skilled in the art that the present invention can be easily performed without the specific examples shown or by modification of the examples.

As used herein, the term "character" represents image information for visually displaying statuses of a portable terminal. The following description is based on an assumption that the character is an avatar. The term "emotion model" refers to a model for expressing statuses of a portable terminal by means of emotion values estimated from the statuses. The emotion model reflects only the emotion expression event model in the first embodiment of the present invention and reflects all of the emotion expression event model, the biorhythm model, and the growing event model in the second embodiment of the present invention.

The emotion models according to an embodiment of the present invention define a rule by which the character dynamically changes according to a user's life, lifestyle or habit of using the portable terminal. The dynamic change of the character may make the user feel as if the character is living and growing. Therefore, due to such a feature, the character emotion model shows a remarkable difference from existing characters and provides an opportunity for users to experience the character emotion model with greater friendliness.

Figure 1:
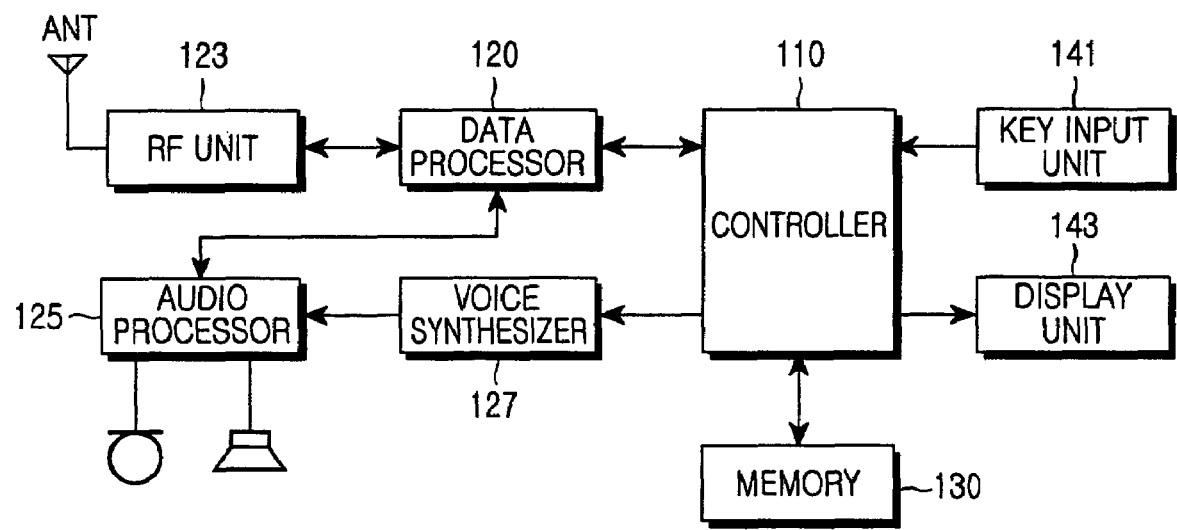
FIG. 1 is a block diagram showing a construction of a portable terminal according to an embodiment of the present invention.

FIG. 1 is a block diagram showing a construction of a portable terminal (or a portable phone) according to an embodiment of the present invention.

Referring to FIG. 1, a radio frequency (RF) unit 123 performs a wireless communication function for the portable terminal. The RF unit 123 includes an RF transmitter (not shown) for up-converting and amplifying a frequency of a transmitted signal and an RF receiver (not shown) for low-noise amplifying and down-converting a frequency of a received signal. A data processor 120 includes a transmitter for coding and modulating the transmitted signal and a receiver for decoding and demodulating the received signal. That is, the data processor 120 may include a MODEM and a CODEC. A voice synthesizer 127 converts text data output from a controller 110 into a voice signal.

A key input unit 141 includes various functional keys for inputting numbers and character data and for setting various functions.

A memory 130 includes a program memory and a data memory. The program memory stores not only various functional programs of the portable terminal but also programs for expressing statuses of the portable terminal as emotional states of the character according to embodiments of the present invention. The data memory temporarily stores data generated while executing the programs. In addition, the data memory includes a character memory for storing character files according to the embodiments of the present invention. The character memory may include a character structure memory and a character image memory. The character structure memory stores header information of character files and the character image memory stores information of actual images which perform animation. The character memory may store a file system including the characters, and each character may have an index of a memory (or file system). When the character files are stored in the character memory, they may be classified according to the types of actions or reactions of the characters. In the present embodiment of the present invention, the characters may be avatars.

The controller 110 controls an operation of the portable terminal. The controller 110 may include the data processor 120. That is, the portable terminal may have a mobile station modem (MSM) chip into which the controller 110, the data processor 120, an audio processor 125, and the voice synthesizer 127 are integrated. According to one embodiment of the present invention, the controller 110 controls operations of converting an event occurring in the portable terminal into an emotion variance value, accessing a character emotion model corresponding to the emotion variance value in the character memory, and displaying the character emotion model as an emotional state of the portable terminal. The following description is based on an assumption that the character is an avatar.

A display unit 143 displays a state of the portable terminal under the control of the controller 110. The display unit 143 may include a liquid crystal display (LCD). That is, the display unit 143 may include an LCD controller, a memory for storing display data, and an LCD device. When the LCD is a touch screen type LCD, the LCD may act as an input unit.

Referring to FIG. 1, in a state where electric power is supplied to the portable terminal, the controller 110 controls the operation of the portable terminal. Whenever an event occurs in the portable terminal, the controller 110 enables the corresponding event to be displayed on the display unit 143. Here, the event may be system reporting, termination and origination of a call, termination and origination of a text message, setting and releasing of an alarm, execution of multimedia, execution of wireless Internet, and so on. Further, when the event occurs as described above, the controller 110 processes the event, changes the emotion value according to the number of occurrence of the event and the kind of the event, accesses an avatar emotion model corresponding to the changed emotion value in the avatar memory within the memory 130, and causes the display unit 143 to display the corresponding emotion model. According to embodiments of the present invention, the avatar emotion model may be displayed either through an animation or still image.

According to the kinds of processed events, the emotion value of the portable terminal either may be changed or may not be changed. Here, the events requiring change of the emotion value of the portable terminal may be stored in the avatar memory within the memory 130. When the event has occurred, the controller 110 compares and analyzes the event with the events stored in the avatar memory, thereby determining whether to change the emotion value of the portable terminal.

Hereinafter, operation of a portable terminal according to origination and termination of a call and origination and termination of a text message from among the events of the portable terminal will be discussed.

First, when the user originates a call, the controller 110 detects the call origination. Thereafter, if the user performs dialing through the key input unit 141, the controller 110 detects the dialing operation, processes the dialed information received through the data processor 120, and then outputs a RF signal through the RF unit 123. Thereafter, when the called party responds, the controller 110 detects the response through the RF unit 123 and the data processor 120. Then, the controller 110 enables communication by forming a traffic channel established by the RF unit 123, the data processor 120, and the audio processor 125. Here, the communication event by the originating call is an event requiring a change in the emotion value. Therefore, the controller 110 changes the emotion value after processing the communication event by the originating call in the way described above. Thereafter, the controller 110 accesses the avatar memory within the memory 130 and controls the display unit 143 to display an avatar emotion model corresponding to the changed emotion value in the avatar memory.

Further, when a terminating call is received, the controller 110 detects the terminating call through the data processor 120 and signals the terminating call. Then, if the communication key is pressed, the controller 110 processes the terminating call. Here, the communication event by the terminating call is an event requiring a change of the emotion value. Therefore, the controller 110 changes the emotion value after processing the communication event by the terminating call in the manner described above. Thereafter, the controller 110 accesses the avatar memory within the memory 130 and controls the display unit 143 to display an avatar emotion model corresponding to the changed emotion value in the avatar memory.

First, when a function key for transmitting a text message is pressed in the transmitter-side portable terminal, the controller 110 generates a text message corresponding to input data and transmits the generated text message through the data processor 120 and the RF unit 123 according to the user's request. In transmitting the text message, a phone number or an e-mail address of the receiving subscriber is input, the controller 110 detects the input and controls transmission of the generated message. Here, the transmission of the text message also is an event requiring a change in the emotion value. Therefore, the emotion value is changed and a corresponding avatar emotion model is displayed.

Further, when a terminating text message is received, the controller 110 processes the terminating text message. Simultaneously, the controller 110 analyzes the text message and changes the emotion value according to the contents of the text message. That is, when the text message is received, the controller 110 analyzes words or special characters for expressing emotions within the received text message and changes the emotion value in accordance with the result of the analysis. In the case of the text message receiving event, the emotion value is changed first by the event of receiving the text message and second by the content of emotional expression within the received text message. According to embodiments of the present invention, the text message includes messages of Short Message Service (SMS), E-Mail Message Service (EMS) messages, and Multimedia Message Service (MMS). Further, the text message includes all messages which can be expressed by using text in a portable terminal.

In the text message according to an embodiment of the present invention, text data for changing the emotion value may include emoticons (predetermined special characters) and words expressing reaction to the avatar in order to express a change in emotion. Further, the emoticons and words which are text (controlled by message (CBM)) data for controlling reaction of avatars must be pre-stored in the avatar memory of the memory 130. That is, the avatar memory of the memory 130 may store a file system including characters, and each avatar may have an index of a memory (or file system). Further, the avatar memory may have different arrangements and constructions corresponding to various details such as actions, facial expressions and appearances of avatars according to various events. That is, the avatar information may be stored according to various types of reactions of avatars in the avatar memory. Further, emoticons and words capable of expressing emotions of avatars by analyzing text data in the text message must be pre-registered in the avatar memory.

Hereinafter, a process of selecting and displaying an emotion model of a portable terminal while changing the emotion value according to each event in a portable terminal having the construction as described above.

Figure 2:
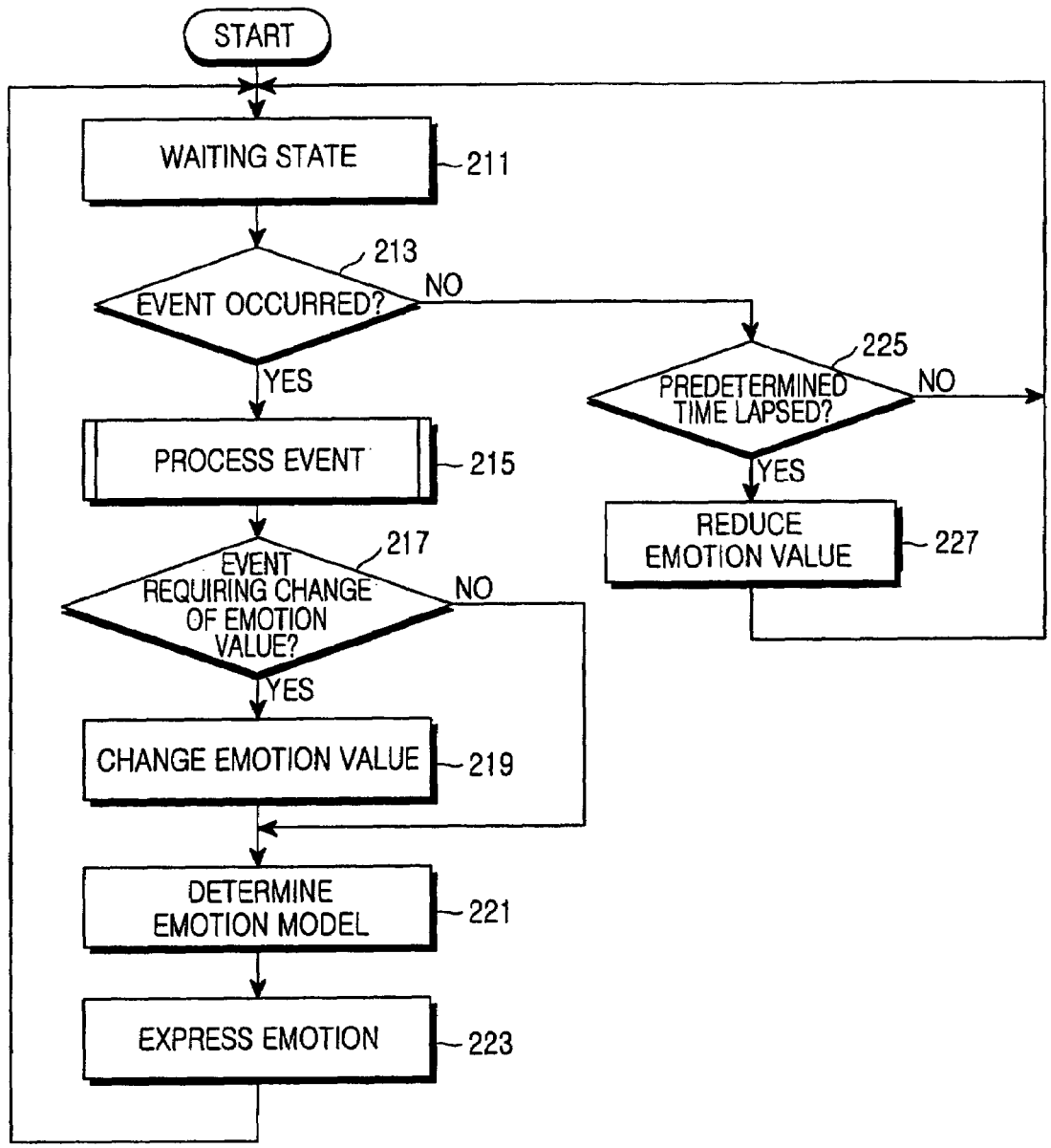
FIG. 2 is a flowchart of a process according to an embodiment of the present invention, for displaying a character emotion model of the portable terminal based on a status of the portable terminal.

FIG. 2 is a flowchart of a process according to an embodiment of the present invention, for processing an event occurring in a portable terminal and displaying an emotion model of the portable terminal while changing the emotion value according to the processed event. The avatar emotion model has an imaginary emotion which changes in response to use of the portable terminal as does human emotion. Therefore, an avatar model expressing an emotion is selected and displayed on a screen of the mobile terminal. According to the avatar emotion display function, emotion values are accumulated according to occurrence of the events and an avatar model corresponding to the accumulated emotion value is selected and displayed. Further, avatar emotion models corresponding to the emotion values are pre-stored in the avatar memory of the memory 130. The avatar emotion models stored in the avatar memory may be avatar animation data as shown in FIGS. 8A through 8E.

Figure 8A:
FIGS. 8A through 8E illustrate character emotion models according to an embodiment of the present invention.
Figure 8B:
Figure 8C:
Figure 8D:
Figure 8E:
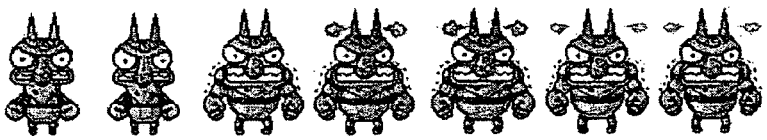

The avatar models shown in FIG. 8A represent an avatar animation displayed when the avatar feels very happy. In this case, the avatars show a special action. The avatar models shown in FIG. 8B represent an avatar animation displayed when the avatar feels happy. In this case, the avatars show an emotional state of joy. The avatar models shown in FIG. 8C represent an avatar animation displayed when the avatar's feeling is in a normal state. In this case, the avatars show an emotional state of shyness. The avatar models shown in FIG. 8D represent an avatar animation displayed when the avatar feels sad. In this case, the avatars show an emotional state of sadness. The avatar models shown in FIG. 8E represent an avatar animation displayed when the avatar feels upset. In this case, the avatars show an emotional state of anger.

The controller 110 changes the emotion value of the portable terminal according to the number and kind of the events of the portable terminal while performing the process as shown in FIG. 2. Also, the controller 110 selects an avatar emotion model corresponding to an emotion variance value from among the models shown in FIGS. 8A through 8E and displays the selected model on a screen of the display unit 143. The avatar images as shown in FIGS. 8A through 8E are stored in the avatar memory within the memory 130. Further, as shown in FIG. 2, when an event occurs, the controller 110 processes the event, changes the emotion value of the portable terminal by taking into consideration an emotion variance value corresponding to the processed event, sets an avatar emotion model corresponding to the emotion variance value, and displays the avatar emotion model on a screen of the display unit 143.

Referring to FIG. 2, when an event occurs while the controller 110 is in a waiting state in step 211, the controller detects the occurrence of the event in step 213 and processes the event in step 215. The event processed in step 215 may be either an event requiring a change of the emotion value or an event having no influence on the change of the emotion. Therefore, the controller 110 processes the event in step 215 and determines if the processed event is an event requiring a change of the emotion value in step 217. Here, when the processed event is an event requiring a change of the emotion value, the controller 110 changes the emotion value of the portable terminal by the emotion variance value preset for the corresponding event. Here, the emotion variance value may be set in advance for the events of the portable terminal. Table 1 below shows an example of emotion variance values preset for events of the portable terminal.

TABLE 1

| Application | Event | Emotion Variance Value |
|---|---|---|
| Phone Book | Addition of a contact card in Phone Book | +1 |
| | Deletion of a contact card from Phone Book | −1 |
| Text Message | Sending an SMS message | +1 |
| | Receiving an SMS message | +1 |
| | Sending an MMS message | +1 |
| | Receiving an MMS message | +1 |
| | Sending a CBM message (affirmative action) | +2 |
| | Receiving a CBM message (negative action) | −2 |
| Camera | Photographing a still image | +1 |
| | Photographing a moving image | +1 |
| Phone | Receiving a call | +2 |
| | Transmitting a call | +2 |
| | Record of a missed call | −1 |
| WAP | WAP access | +2 |
| | WAP download | +2 |
| Automatic Emotion Change | The emotion value automatically decreases while the mobile terminal is not used. | −(current emotion value/24 hours) |

After changing the emotion value of the portable terminal in consideration of an emotion variance value corresponding to an occurred event as shown in table 1 or without change of the emotion value, the controller 110 analyzes the emotion value of the portable terminal in step 221 and selects an avatar model expressing an emotion state of the portable terminal. Here, it is assumed that the emotion of the portable terminal can be expressed by numerical values and the numerical values for expressing the emotion values are within a range from 0 to 100. Further, it is assumed that the emotion values of the portable terminal can be divided into five classes which can express emotional states as shown by Table 2 below. However, it should be appreciated by those skilled in the art that the present invention can process less or greater than five classes without departing from the scope of the present invention. Based on the emotion states shown in Table 2, an avatar model can be selected from among the models shown in FIGS. 8A through 8E.

TABLE 2

| Emotion Value Class (larger than~equal to or less than) | Emotion state | Emotion Model |
|---|---|---|
| 0~40 | Angry | FIG. 8E |
| 10~30 | Sad | FIG. 8D |
| 30~60 | Shy | FIG. 8C |
| 60~90 | Happy | FIG. 8B |
| 90~100 | Special | FIG. 8A |

The avatar emotion model is determined based on the criterion as shown in Table 2 and according to the changed emotion value. Then, in step 223, the controller 110 accesses the determined avatar emotion model from the avatar memory within the memory 130 and displays the determined avatar emotion model on a screen of the display unit 143 as shown in FIGS. 8A through 8E.

When no event occurs during more than a predetermined period of time in the waiting state, the controller 110 detects it in step 225, reduces the emotion value of the portable terminal in step 227, and then returns to the waiting state of step 211. This corresponds to a state in which the portable terminal has not operated during more than a predetermined period of time in the waiting state, which means the occurrence of no event in the waiting state. That is, the state in which the portable terminal performs no operation while being powered functions as a parameter reducing the emotion value of the portable terminal. Here, the portable terminal may be set to have an emotion value of 0 when the portable terminal has not operated for more than 24 hours (that is, when the portable terminal has stayed in the waiting state or a power-off state for more than 24 hours).

After the event is processed in the manner as described above, the emotion state of the portable terminal may be displayed using the avatar emotion model. Therefore, as noted from Table 1, a happy avatar model is selected and displayed on the portable terminal when affirmative events frequently occur. In contrast, when the frequency of events is low or negative events frequently occur, an unhappy avatar model is selected and displayed on the portable terminal.

Figure 3:
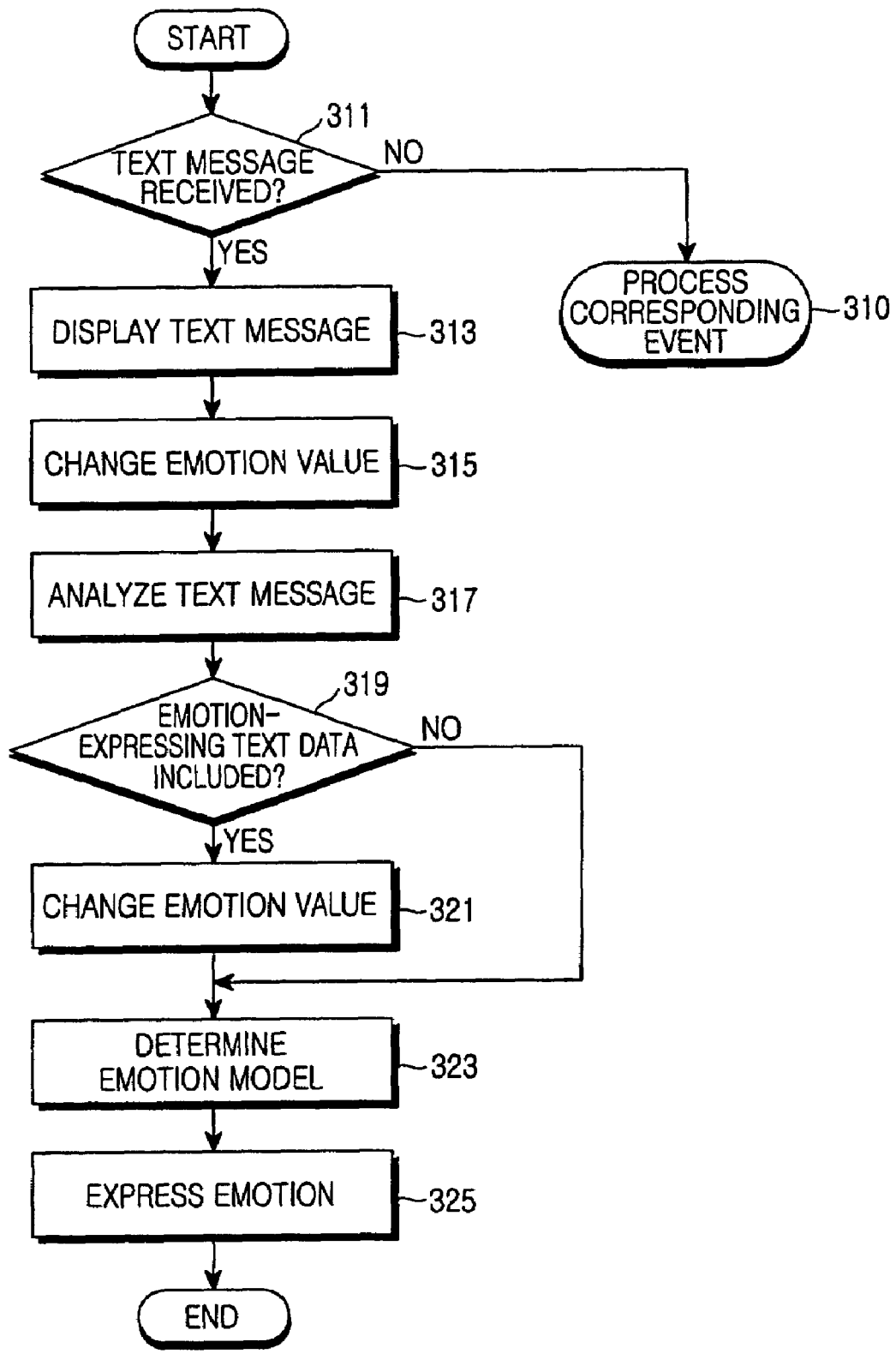
FIG. 3 is a flowchart of a process for changing the emotion value according to the reception of a text message according to an embodiment of the present invention.

FIG. 3 is a flowchart of a process for changing the emotion value according to the reception of a text message from among the events shown in Table 1.

Referring to FIG. 3, if a text message is not received, the controller 110 processes a corresponding event in step 310. If a text message is received, the controller 110 detects the reception of the text message in step 311 and displays the received text message on a screen of the display unit 143 in step 313. In step 315, the controller 110 adds '1' (which is the emotion variance value corresponding to the reception of the text message as shown in Table 1) to the current accumulating emotion value. After changing the emotion value in step 315, the controller 110 analyzes the received text message to determine if the received message includes an affirmative content or a negative content in step 317. For example the determination of negative content can be based on the detection of specific words that can be user defined or system defined.

Here, the process of analyzing the text message proceeds as follows.

First, the controller 110 performs parsing of a text stream of the received text message and then examines the types of text data in the parsed text stream. Here, the types of text data include, in brief, general letters (text data which include alphabets, numbers and special symbols and cannot be expressed by avatars), avatar expression letters (text data which include alphabets, numbers and special symbols and can be expressed by avatars), and emoticons (emoticon data which can express avatar). That is to say, the avatar expression letters and the emoticons may be text data expressing emotion states and stored in the avatar memory within the memory 130. Therefore, the controller 110 parses the text stream of the received text message and determines if the received data express the emotion by comparing and analyzing the parsed letters with the emoticons or avatar expression letters. Here, when the received data do not express the emotion, the controller 110 displays the data determined as the general letters on a screen of the display unit 143.

In contrast, when the received data express the emotion, the controller 110 determines if the emotion expressed by the data is an affirmative emotion or a negative emotion. Here, the emotions expressible by using the avatars include 'happiness', 'shyness', 'anger', 'embarrassment', and 'sadness'. The reactions or the expressible emotions of the avatars may include various emotions in addition to the enumerated emotions.

There are various ways of determining the content of the text message based on the emotion-expressing data included in text message. The first method is to determine the content of the text message on the basis of the first emotion-expressing word included in the text message or the data determined by the emoticons. The second method is to determine the content of the text message on the basis of emotion-expressing words or most frequent emoticons included in the text message. The third method is to determine the content of the text message on the basis of emotional expressions by the emoticons included in the text message. The fourth method is to determine the content of the text message on the basis of both emotion-expressing words and emoticons included in the text message. In the fifth method, priorities are given to emotional expressions, data included in the text message are analyzed, and an emotional expression with a largest priority is determined as the content of the text message.

One of the methods described above can be used to determine the content of the text message on the basis of emotion-expressing words and emoticons included in the text message. Here, it is possible to set 'happy' and 'shy' as affirmative text data, 'sad' and 'angry' as negative text data, and 'embarrassed' as data having no influence on the change of the emotion value. A synthetic determination according to the method of determining the text data as described above enables determination of an affirmative or a negative emotion value based on the content of the text message.

After determining the content of the text message in the way as described above in step 317, the controller 110 determines if the text message includes emotion-expressing text data in step 319. In step 321, when the text message includes emotion-expressing text data, the controller 110 determines the content of the text message according to one of the five determination methods as described above and changes the emotion value of the portable terminal by adding or subtracting the emotion variance value as shown in Table 1. In step 323, the controller 110 determines one emotion model corresponding to the changed emotion value from among the emotion models as shown in FIGS. 8A and 8B. In step 325, the controller 110 accesses the determined avatar emotion model in the avatar memory and displays it on a screen of the display unit 143.

FIG. 3 shows a process of changing the emotion value of the portable terminal according to an event of receiving a text message. However, the events requiring change of the emotion value of the portable terminal include other kinds of events as well as the reception of the text message. Also, such a change of the emotion value of the portable terminal results in change of the emotion model displayed on the portable terminal. Here, the emotion value of the portable terminal increases when affirmative events occur, for example, when multimedia functions such as functions of phone, text message, Internet communication, and camera are frequently used, or when registration of information in the portable terminal is actively performed. In contrast, the emotion value of the portable terminal decreases when the portable terminal is not used for long time or when negative events occur, for example, when information registered in the portable terminal is deleted.

The process as shown in FIG. 2 is performed only while the portable terminal operates and does not change the emotion value while the power supply to the portable terminal is off. However, the emotion value may be set to change even in a state in which the power supply to the portable terminal is off. In the process as shown in FIG. 2, if the waiting state continues or terminates is periodically examined in order to change the emotion value. However, instead of performing such a periodic examination in the waiting state, a time interval during which the portable terminal has not operated can be determined at a time point at which an event occurs or the display unit of the portable terminal is operated.

Figure 4:
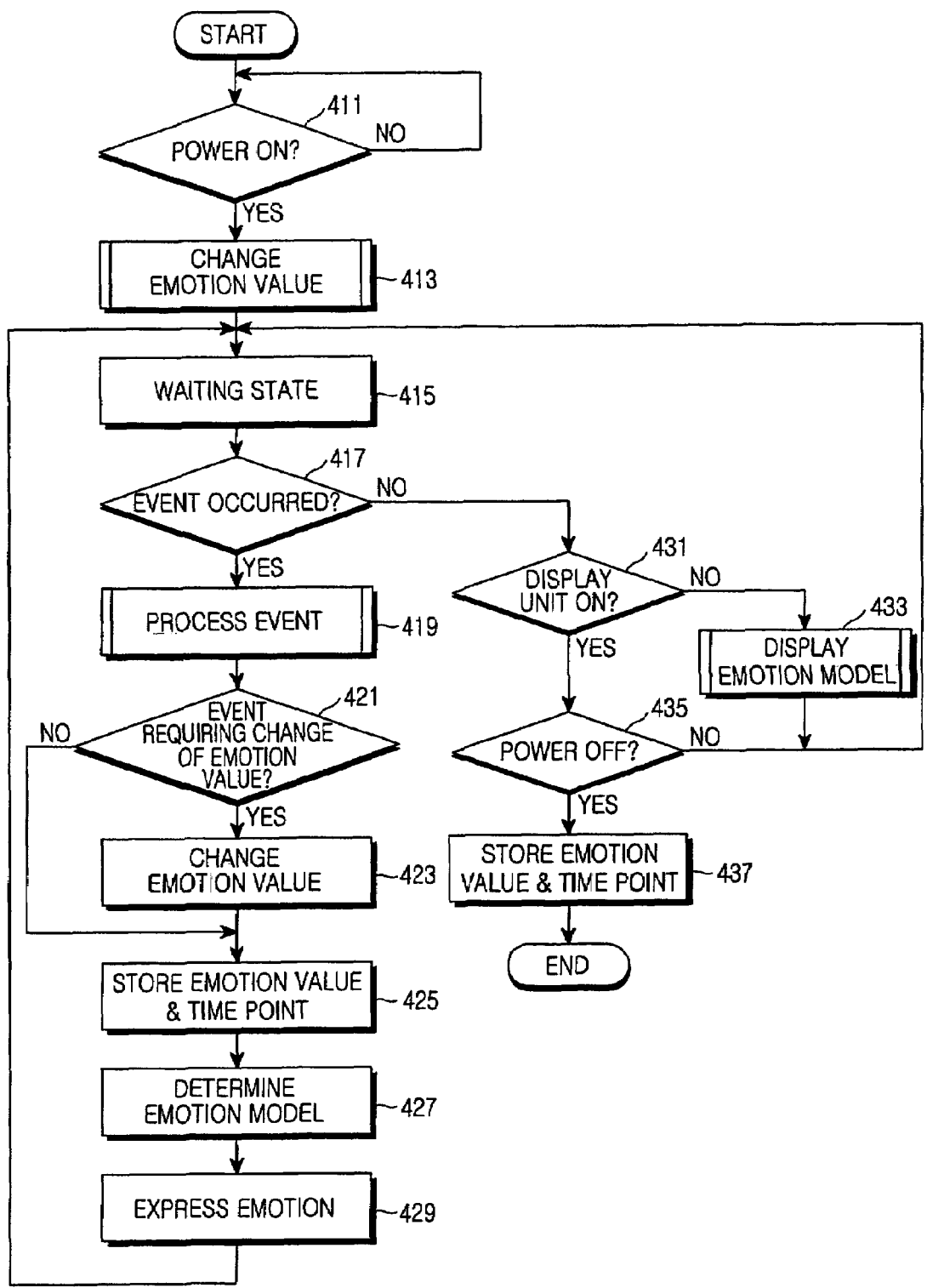
FIG. 4 is a flowchart of a process for displaying a character emotion model of the portable terminal according to another embodiment of the present invention.

FIG. 4 is a flowchart of a process according to another embodiment of the present invention, in which the emotion value is changed based on the time interval during which the power of the portable terminals is off or the time interval during which the display unit is not operated in a waiting state.

Referring to FIG. 4, when power of the portable terminal is on, the controller 110 detects it in step 411 and changes the emotion value of the emotion model in step 413. The operation in step 413 proceeds as shown in FIG. 5 which is a flowchart of a process for changing the emotion value of the portable terminal when power starts to be supplied to the portable terminal from the power-off state.

Figure 5:
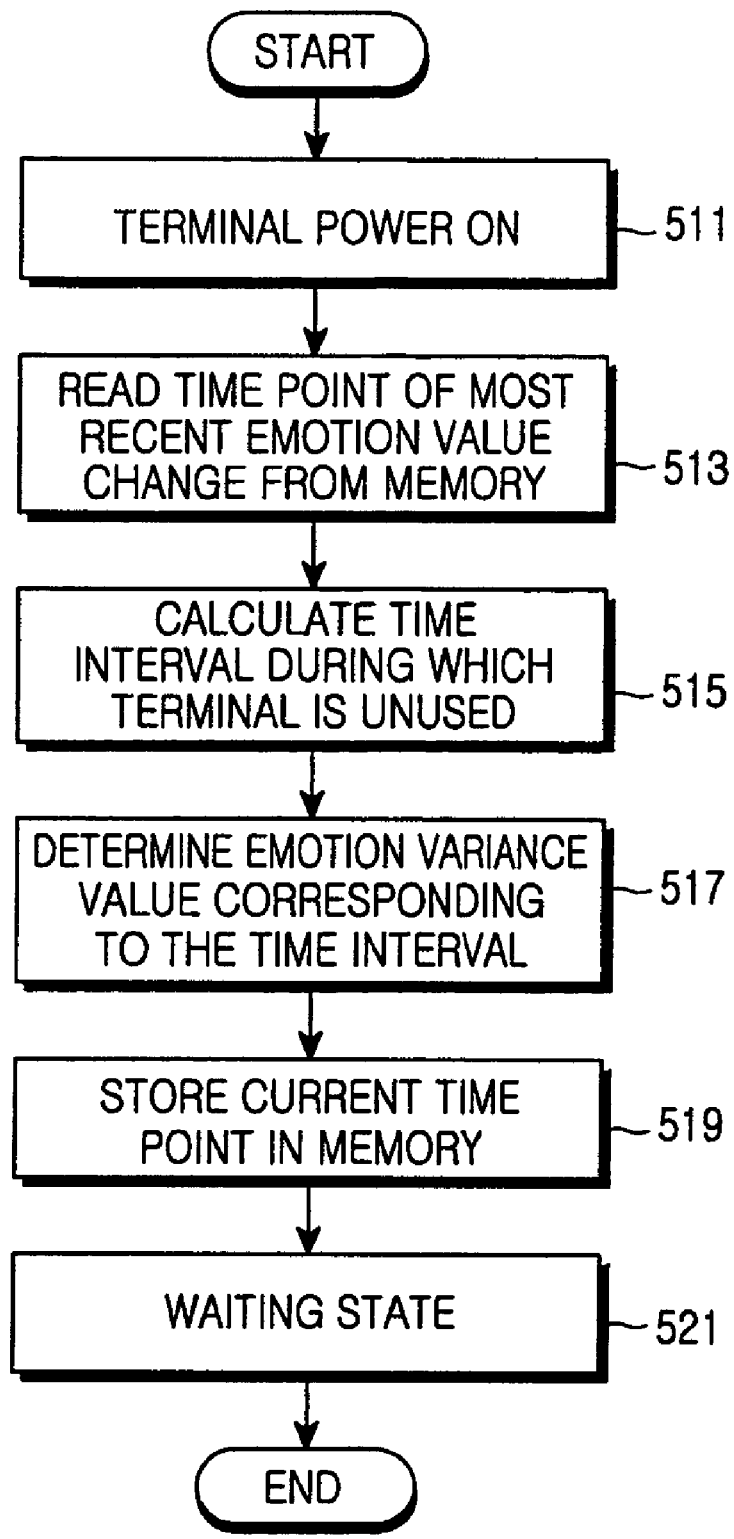
FIG. 5 is a flowchart of a process for changing the emotion value of the portable terminal when power of the portable terminal is on according to an embodiment of the present invention.

Referring to FIG. 5, when the portable terminal is turned on in step 511, information about the time point of the most recent change of the emotion value is read from the memory 130 in step 513. In step 515, the time point read in step 513 is subtracted from the current time point, so as to calculate a time value to be used for the change of the emotion value. In step 517, the controller 110 determines an emotion variance value by applying a formula (such as Table 1) stored in the memory 130 to the calculated time value, determines a corresponding emotion model by applying the determined emotion variance value to the emotion value of the portable terminal, and then displays the corresponding emotion model on a screen of the display unit 143. In step 519, the controller 110 stores in the memory 130 the current time point at which the emotion value has been changed. In step 521, the controller 110 shifts into the waiting state which is the same as that in step 415 of FIG. 4. In other words, when power is supplied to the portable terminal, the time interval during which the power of the portable terminal is off is calculated and the emotion value of the portable terminal is changed by applying the calculated time interval to one of the emotion variance values in Table 1. Then, one model corresponding to the changed emotion value is selected from the emotion models as shown in FIGS. 8A through 8E and is displayed on a screen of the display unit 143.

The controller 110 having transited into the waiting state in step 415 examines if an event has occurred in step 417. In step 419, the controller 110 processes the event. Here, the event processed in step 419 may be either an event requiring change of the emotion value of the portable terminal or an event having no influence on the change of the emotion. In the present embodiment, it is assumed that the processed event is an event requiring change of the emotion value of the portable terminal as events in Table 1. After processing the event in step 419, the controller 110 determines if the processed event is an event requiring change of the emotion value of the portable terminal in step 421. When the processed event is an event requiring a change of the emotion value of the portable terminal, the controller 110 accesses an emotion variance value corresponding to the event and changes the emotion value of the portable terminal in step 423.

After changing the emotion value of the portable terminal by using an emotion variance value corresponding to the occurred event in Table 1 or without change of the emotion value, the controller 110 stores in the memory 130 the time point at which the emotion value is processed. Here, the controller 110 subtracts the time point previously registered before the occurrence of the event from the time point of the occurrence of the event, so as to calculate a time interval during which the terminal has not been used. Further, when the time interval exceeds a time value set in Table 1, the controller 110 changes the emotion value of the portable terminal by subtracting an emotion variance value corresponding to the time interval from the current emotion value. Therefore, when the event has occurred, the controller 110 changes the emotion value by taking both the emotion variance value corresponding to the event and the emotion variance value corresponding to the non-use time interval into consideration in step 423. In step 425, the controller registers the time point of the occurrence of the event, in order to use the time point in changing the emotion value next time due to non-use of the portable terminal.

The emotion value of the portable terminal changed in step 425 corresponds to one of the values in Table 2. In step 427, the controller 110 determines an emotion model corresponding to the changed emotion value. Here, it is assumed that the emotion of the portable terminal can be expressed by numerical values and has a numerical value within a range from 0 to 100. Further, it is assumed that the emotion values of the portable terminal can be divided into five classes which can express emotional states as shown by Table 2. Based on the emotional states shown in Table 2, an avatar emotion model can be determined from among the models shown in FIGS. 8A through 8E.

After an avatar emotion model corresponding to the changed emotion value is determined based on the emotional states shown in Table 2 in step 427, the controller 110 accesses the determined emotion model from the avatar memory within the memory 130 and displays the model on a screen of the display unit 143 as shown in FIGS. 8A through 8E in step 429.

Figure 6:
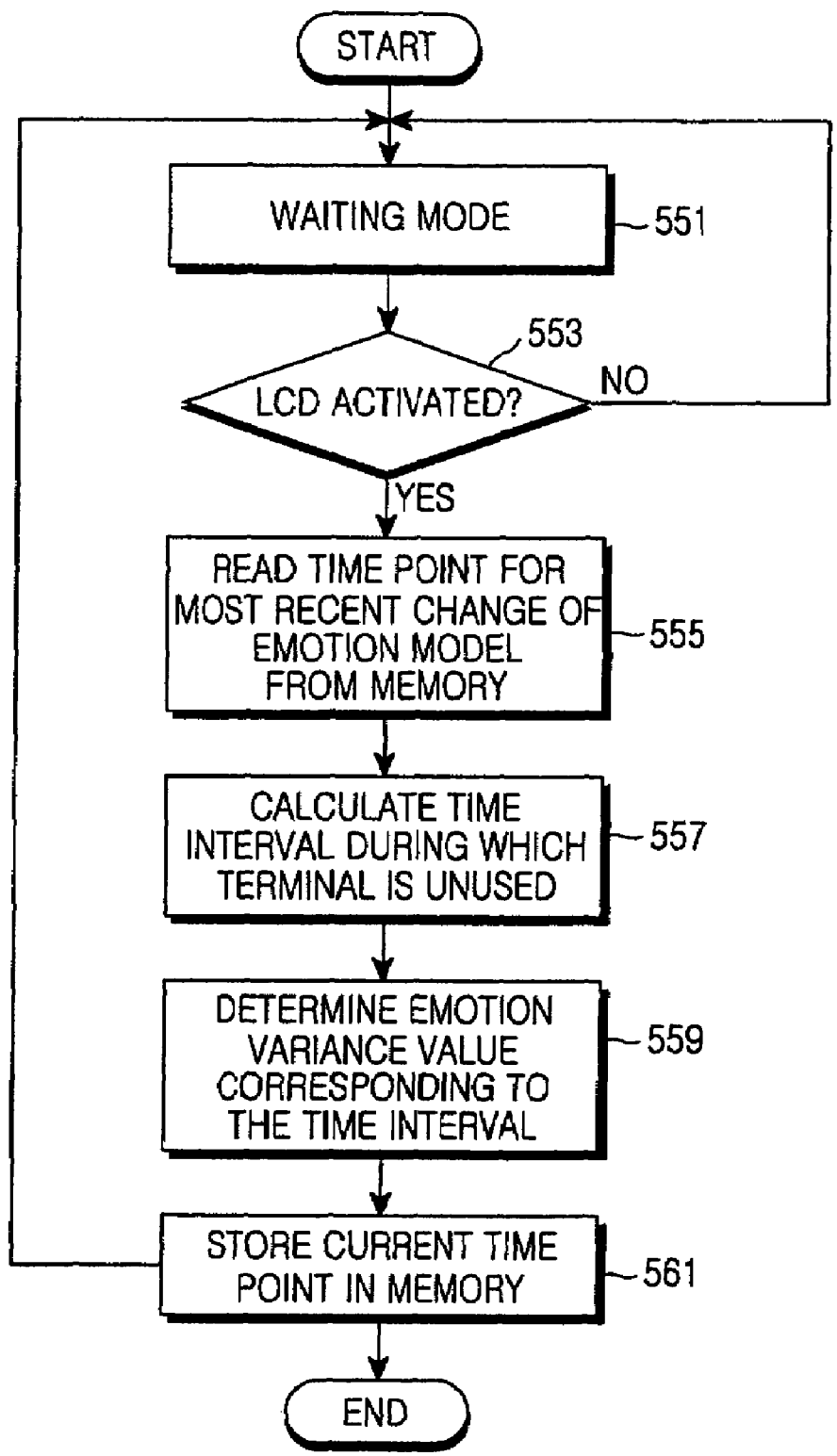
FIG. 6 is a flowchart of a process for changing the emotion value of the portable terminal by accounting the time interval during which the portable terminal is not operated in the waiting state according to an embodiment of the present invention.

In the waiting state, when a folder of the portable terminal is opened or the display unit 143 is operated, the controller 110 detects it in step 431 and changes the emotion value (which has been reduced in the waiting state) in step 433. FIG. 6 is a flowchart of a process for changing the emotion value of the portable terminal by accounting for the time interval during which the portable terminal is not operated in the waiting state.

Referring to FIG. 6, in a waiting mode in step 551 when the display unit 143 is activated (for example, when the folder is opened or a key input is performed in order to operate the display unit 143), the controller 110 detects it in step 553, reads from the memory 130 the previous time point at which the emotion value was changed in step 555, and subtracts the previous time point read in the memory 130 from the current time point, thereby obtaining a time interval during which the portable terminal has not operated in step 557. In step 559, the controller 110 determines if the time interval during which the portable terminal has not been operating has a length long enough to change the emotion value of the portable terminal. When the time interval during which the portable terminal has not been operating is long enough to change the emotion value of the portable terminal, the controller obtains a value corresponding to the time interval from Table 1 and applies the obtained value to the emotion value of the portable terminal. In step 561, the controller 110 stores in the memory 130 the emotion value together with the time point at which the emotion value has been changed, accesses an emotion model corresponding to the changed emotion value in the memory 130, and displays the emotion model on a screen of the display unit 143. In other words, the controller 110 confirms a time interval during which the portable terminal has stayed in the waiting state at the time point at which the display unit 143 is on, and uses the confirmed time interval as a parameter for reducing the emotion value of the portable terminal.

Figure 7:
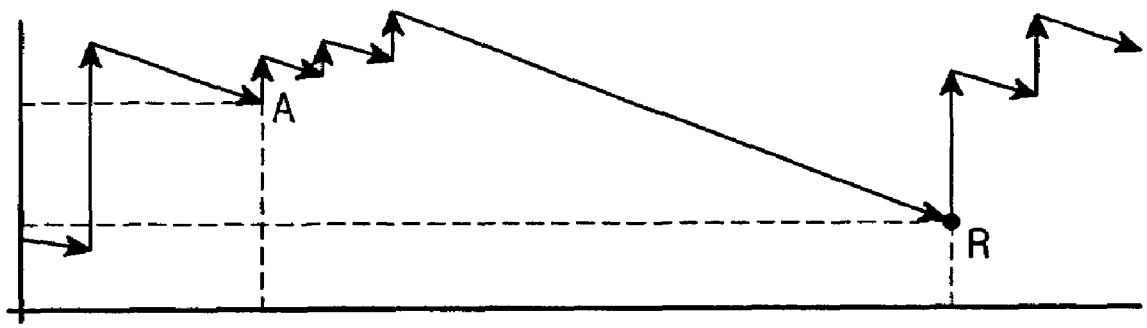
FIG. 7 is a graph illustrating change in the emotion value of the portable terminal according to passage of time according to an embodiment of the present invention.

When the process as shown in FIGS. 2 and 4 is performed, the emotion value of the portable terminal changes in the manner as shown in FIG. 7. In FIG. 7, the descending lines represent an automatic change of the emotion value and the ascending lines represent increase of the emotion value due to occurrence of events in the portable terminal. As noted from FIG. 7, when the portable terminal does not operate in the waiting state, the portable terminal undergoes an automatic emotion change and the emotion value of the portable terminal decreases in proportion to the time interval during which the portable terminal has not operated. When an event occurs and the portable terminal processes the event for the first time, the emotion value increases. In other words, the emotion value increases or elevates when the frequency of the event occurrence increases, while the emotion value decreases or lowers according to the increase of the time interval during which the waiting state continues or the portable terminal is off. When the portable terminal is in the waiting state or a power-off state, that is, when the portable terminal is not used, the emotion value of the portable terminal is set to zero. As noted from FIG. 7, the emotion value of the portable terminal continuously changes without interruption.

A user can understand an emotion value or status of the portable terminal by confirming the emotion model change according to the state of use of the portable terminal as described above. For this function, the menu of the portable terminal includes an item for viewing an emotional state of the avatar. When the user selects the item for viewing an emotional state of the avatar in the menu, the controller 110 selects an emotion model corresponding to a current emotion value stored in memory 130 and displays the selected model on a screen of the display unit 143.

When the avatar emotion model is displayed, the controller 110 of the portable terminal can display a message corresponding to the current emotion model. The message refers to a message corresponding to an emotion model determined based on the emotion value of the portable terminal, which can be expressed as shown in Table 3 in the portable terminal having the five types of emotional states as shown in Table 2.

TABLE 3

| Status  | Text Data                                                      |
|---------|----------------------------------------------------------------|
| Special | R.O.T.F.L.M.A.O !                                              |
|         | I'm so psyched !                                               |
| Happy   | It's weird. I'm really having a good day!                      |
|         | Wow, this is so cool!                                          |
| Shy     | I'm bored out of my mind.                                      |
|         | Is there nothing to do today?                                  |
| Sad     | No way.. :(I can't believe it..                                |
|         | I'm gonna cry... :(                                            |
| Angry   | This sucks!                                                    |
|         | This day sucks! Worst day of my life!                          |

After processing the event as described above, the controller can express the emotional state of the portable terminal by using the avatar emotion model. When the frequency of event occurrence is high or affirmative events frequently occur, a happy avatar model is selected and the emotional state of the portable terminal is displayed looking happy. In contrast, when the frequency of event occurrence is low or negative events frequently occur, an unhappy avatar model is selected and the emotional state of the portable terminal is displayed looking unhappy.

In the first embodiment of the present invention having the construction as described above with reference to FIGS. 2 through 8E, only one type of emotion models are employed (specifically, the emotional state of the portable terminal is expressed by using only emotion expression event models). However, the emotion model of the portable terminal may be set by using other types of models in addition to the emotion expression event models. In the second embodiment of the present invention, the emotion model of the portable terminal is determined based on multiple types of models and the emotional state of the portable terminal is displayed by using the determined emotion model.

In the second embodiment of the present invention, the emotion variance values are allocated to events, emotion variance values of events are accumulated when the events are processed, and the emotional state of the portable terminal is expressed by using characters. Further, the portable terminal includes at least two sets of character images, the emotion level is changed according to the emotion value of the portable terminal, and expression of the emotional state of the portable terminal ends when the emotion value exceeds a predetermined value or a predetermined number of days have passed. In the second embodiment of the present invention, the characters are referred to as emotion models. The characters are general terms for images capable of visually expressing the emotional states of the portable terminal and are assumed to be avatars in the embodiments of the present invention.

In other words, the avatar emotion model implies an avatar model which dynamically changes according to use of the portable terminal. In the second embodiment of the present invention, the avatar emotion model supporting the dynamic change of the avatar includes three types of sub-models including an emotion expression event model, a growing event model and a biorhythm model. It is assumed that the emotion expression event model has an emotion value changing according to the use of the portable terminal and uses multiple information parameters. In the second embodiment of the present invention, it is assumed that the information parameter of the emotion expression event model includes three information parameters of sense, popularity and intelligence. The biorhythm model may be used in changing the emotion value of the emotion expression event model for each event. The growing event model relates to a level change event and an ending event. The level change event changes the level up or down according to the emotion value. In the case of the ending event, when the emotion value exceeds a predetermined value or a value corresponding to a predetermined number of days, the emotion value is initialized and the process for selecting and displaying the emotion model is started again.

In the following description, the terms 'emotion model' and 'emotion expression event model' are distinct from each other and are used as terms each having independent meaning.

In the case of the avatar emotion expression event model, each avatar is provided with at least one information parameter. In the present embodiment, the avatar emotion expression event model is provided with three types of parameters including sense, popularity and intelligence. The parameters of the emotion expression event model may be either reduced or added if necessary. Each of the information parameters continuously changes by a rule defined based on the pattern in which the portable terminal is used (e.g., transmission or reception of a phone call, transmission or reception of a text message, use of a camera, and so on). That is, events which may occur in the portable terminal are classified, emotion variance values of the parameters are respectively allocated to the events, and the allocated emotion variance values are accumulated as values of corresponding parameters, so that the emotion value of the portable terminal is renewed by using the accumulated values. Each avatar has multiple emotional states according to the emotional states of the information parameters. In the present embodiment, it is assumed that the avatar has five emotional states, which includes states of 'extreme joy (very happy)', 'happiness (happy)', 'normal', 'worry' and 'sadness (sad)'. The avatar is displayed with an image corresponding to one of such emotional states.

The avatar growing event model is a model which changes a general image of the avatar when the avatar has reached a special state by using three types of information parameters which change based on the avatar emotion expression event model. That is, the avatar growing event model is used as a model for simulation of the growth of the avatar. The image of the avatar changed by the avatar growing event model is reflected and used when every avatar is output on a screen of the portable terminal after the change. When the information parameter has a value exceeding a predetermined emotion value or a value corresponding to a time interval exceeding a predetermined days from the day when the avatar growth is initiated, the growth of the avatar growing event model ends and a new character image is set again, so that the selection and display of another avatar emotion model is performed.

The avatar biorhythm model is a model which is assumed to have a biorhythm based on an imaginary birthday of the avatar, which may be either the first day the avatar was used or the birthday of the user of the portable terminal. The avatar biorhythm information of the avatar includes a sensitivity index, a physical index and an intellectual index. The sensitivity index and the intellectual index have an influence on the sense and intelligence of the avatar emotion expression event model, respectively. The avatar biorhythm model may not be employed according to the user's choice.

The portable terminal according to an embodiment of the present invention which expresses its emotional state may have a construction as shown in FIG. 1.

In the second embodiment of the present invention, the memory 130 may have a construction different from that of the first embodiment of the present invention. The memory 130 according to the second embodiment of the present invention may include a program memory and a data memory. The program memory stores programs for processing calls of the portable terminal and programs for processing avatar emotion models according to embodiments of the present invention. The data memory temporarily stores data generated during execution of the programs. The data memory includes a character memory (or an avatar memory) for storing at least two character image sets in order to process the avatar emotion model, an emotion value table used in processing the avatar emotion model for of each event, a biorhythm value table used in processing the avatar biorhythm model, an emotion state determination table for determining a motion model of the character image, an emotion expression event text table of each motion model according to the determination of the emotion state at the time point of the avatar emotion model expression, an emotion expression event text table of each event having an influence on the emotion value at the time point of the avatar emotion model expression, a condition table according to the statuses of character growth, and an end text table output together with characters at the ending state.

Figure 9:
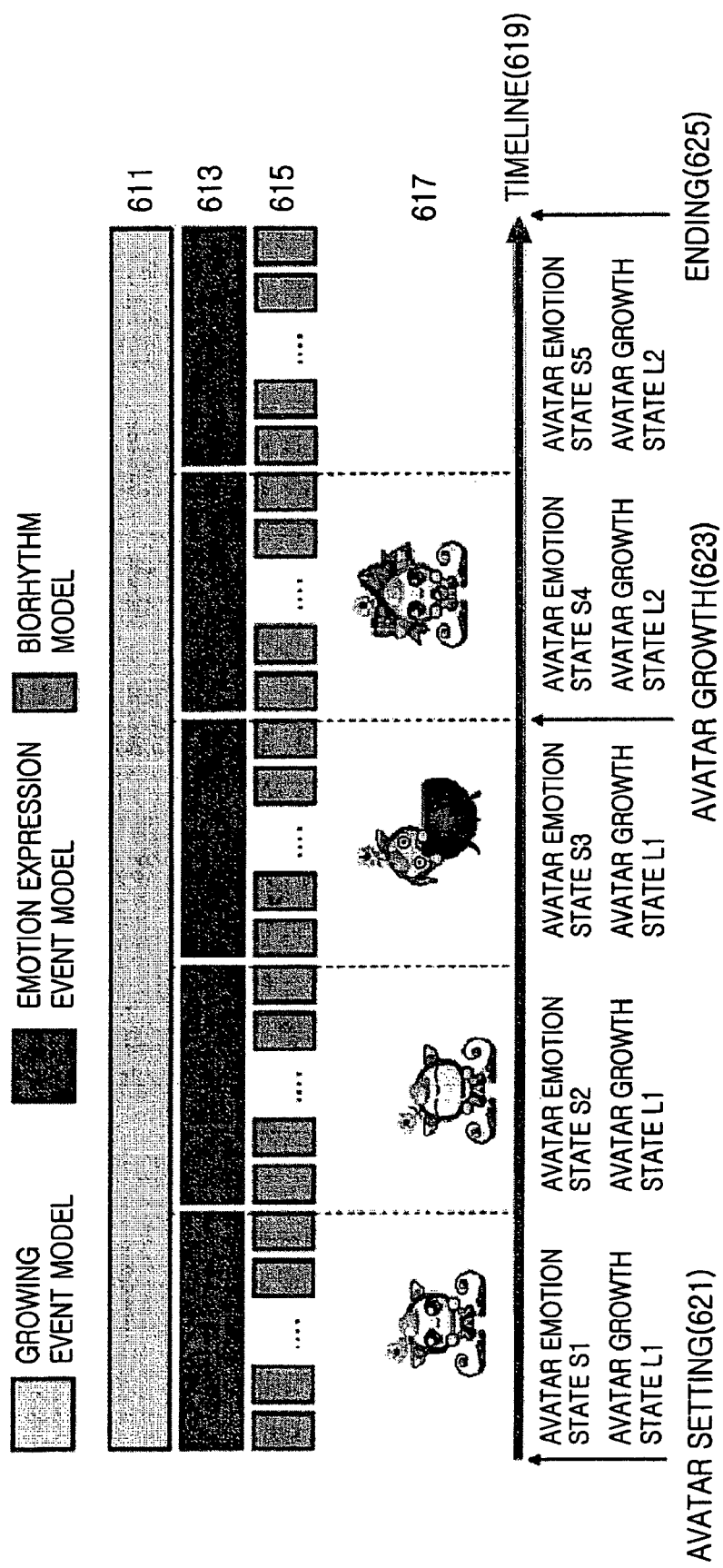
FIG. 9 illustrates a detailed relation between the sub-models of the avatar emotion models according to an embodiment of the present invention.

The dynamic change of the avatar according to the second embodiment of the present invention can be briefly divided into two stages. The first stage is a stage in which the avatar changes according to the emotional state of the avatar defined based on the user's habit of using the portable terminal in a short term. The second stage is a stage in which the avatar changes according to the avatar growth resulted from long-time accumulation of the short-term emotion state as described above. In the avatar emotion model according to the second embodiment of the present invention, the avatar emotion expression event model and the avatar biorhythm model are defined in order to define the short-term emotion state of the avatar and the avatar growing event model is defined in order to define the growth of the avatar according to the emotional state accumulated for a long period of time. FIG. 9 shows the detailed relationship between the sub-models of the avatar emotion models.

As described above, the avatar emotion model and the avatar emotion expression event model are distinct terms having independent meanings. The avatar emotion expression event model is a model for determining an emotional state of a short-term emotion state of the avatar (in the unit of day) and the avatar emotion model is a synthetic model obtained through organic combination of the avatar emotion expression event model, the avatar growing event model and the avatar biorhythm model.

Referring to FIG. 9, the emotion of the avatar is in a specific status when it satisfies a specific condition corresponding to the use of the portable terminal according to passage of time as indicated by reference numeral 619 and undergoes continuous state transition as indicated by reference numeral 617 whenever the condition changes. In FIG. 9, reference numeral 611 denotes the avatar growing event model, reference numeral 613 denotes the avatar emotion expression model, and reference numeral 615 denotes the avatar biorhythm model. The biorhythm model may be either used in the avatar emotion expression model or unused. FIG. 9 shows a process of using the avatar biorhythm model. FIG. 9 defines the emotional state of the avatar and its transition as designated by reference numeral 617 by taking the information of the biorhythm model as designated by reference numeral 615 into consideration. The avatar growing event model as designated by reference numeral 611 expresses the growth status of the avatar, which undergoes a transition when the accumulated short-term change of the avatar emotion expression event model reaches a specific condition. That is, the avatar has two types of emotion-related statuses including the emotion state and the growth status.

In FIG. 9, S1 through S5 represent the short-term emotion states of the avatar expressed by the avatar emotion expression event model and L1 and L2 represent the growth status of the avatar expressed by the avatar growing event model. When an avatar is set and the avatar emotion model is operated at a time point 621 in FIG. 9, the avatar emotion expression event model is operated to dynamically change the emotional states of the avatar as shown by S1 through S3 according to the use of the portable terminal. Further, the avatar emotion expression event model checks the emotion value of the avatar at the time point of expressing the emotion of the avatar and expresses the emotion of the avatar as designated by reference numeral 617. The emotion value of the avatar may be either revised by using the avatar biorhythm model or maintained without using the avatar biorhythm model. In the course of displaying the short-term emotion states as described above, when the emotion value of the avatar exceeds a predetermined value, such an exceeding is detected and the level for the avatar growing event model is changed from level L1 to level L2 at the time point 623. When the level changes, the currently displayed avatar image set for the avatar growing event model can also be changed, so that the user can easily confirm the level change. Even after the emotion level of the avatar is changed as described above, the emotional state of the avatar emotion expression event model may dynamically change as shown by S4 and S5 according to use of the portable terminal. Also, as designated by reference numeral 617, the current emotion value is checked and a corresponding avatar motion model is displayed at the time point of avatar emotion expression. In the state in which the avatar emotion expression event model is operated as described above, when the emotion value of the avatar growing event model exceeds a predetermined value or that a predetermined number of days have passed after the avatar emotion model is operated at the time point 621, it is detected at the time point 625 and the operation of the avatar emotion model is stopped while the ended state is displayed. In the ended state, the above process is repeated at the time point 621 by initializing the emotion values of the avatar and setting a new avatar image set.

As described above, the avatar emotion model may be formed by organic combination of two types of sub-models (the avatar emotion expression event model and the avatar growing event model) or three types of sub-models (the avatar emotion expression event model, avatar biorhythm model and the avatar growing event model), which will be described in detail hereinafter.

First, the avatar emotion expression event model will be discussed.

The avatar emotion expression event model defines status parameters in order to display the emotional state defining the emotion of the avatar. The avatar emotion expression event model may have more than one status parameter. In the present embodiment, it is assumed that the avatar emotion expression event model has three status parameters including sense, popularity and intelligence. In the following description, sense, popularity and intelligence will be referred to as S, P and I, respectively. The SPI values (values of S, P and I) increase or decrease according to the use of the portable terminal. The factors varying the SPI values in the portable terminal may be events such as voice communication, data communication and change of data. In the present embodiment, it is assumed that the factors varying the SPI values include events or use factors as shown in Table 4 below. Table 4 is an SPI update table for changing the SPI values according to the use factors of the portable terminal and is stored in the data memory within the memory 130. Table 4 serves as an emotion value memory in the present embodiment.

TABLE 4

| Event (Use factor of terminal) | Variance of S | Variance of P | Variance of I | Time point |
| --- | --- | --- | --- | --- |
| Addition of a contact card | 0 | 0 | 1 | When the addition of a contact card has been completed. |
| Deletion of a contact card | 0 | 0 | −1 | When the deletion of a contact card has been completed. |
| Change of contact information | 0 | 0 | 1 | When the change of contact information has been completed. |
| Transmission of SMS | 0 | 1 | 0 | At the time of succeeding in the transmission |
| Reception of SMS | 0 | 1 | 1 | At the time of arrival at the terminal |
| Transmission of MMS | 0 | 1 | 1 | At the time of succeeding in the transmission |
| Reception of MMS | 1 | 1 | 0 | At the time of arrival at the terminal |

TABLE 4-continued

| Event (Use factor of terminal) | Variance of S | Variance of P | Variance of I | Time point |
|---|---|---|---|---|
| Use of CBM | 1 | 0 | 0 | At the time of finding emoticon |
| Change of theme | 1 | 0 | 0 | At the time of application |
| Installation of SIS | 0 | 0 | 1 | At the time of completing the installation of SIS |
| Photographing by a camera | 1 | 0 | 0 | At the time of photographing |
| Recording of a moving image | 1 | 0 | 0 | At the time of recording the moving image |
| Reception of a call | 0 | 2 | 0 | At the time of receiving the call |
| Missed call | 0 | −3 | 0 | At the time of stopping to send a call (pressing a function key) before the call is received |

Table 4 or an SPI variance value table is determined by experiments. That is, the user factors of the portable terminal are events processed in the portable terminal and the SPI variance values for each event can be experimentally determined. In processing the event, the controller 110 confirms an emotion variance value corresponding to the event from Table 1 and accumulates the emotion variance value to the SPI emotion value of the previous state, thereby updating the emotion value. For example, in the case of the SMS reception, the controller 110 confirms the SPI variance value corresponding to the reception of SMS from Table 4 stored in the memory 130 and increases each of the status parameters of P and I by '1'. When there was a missed call, the controller 110 confirms the SPI variance value corresponding to the missed call from Table 4 and decreases the status parameter of P by '3'. In other words, when an event occurs in the portable terminal, the controller 110 updates the SPI emotion values accumulated to date with reference to a table such as Table 4.

The emotional state of the avatar is regularly displayed at predetermined time every day based on the SPI values increasing or decreasing as described above. In other words, a predetermined time interval may be set in advance as a time interval for expressing the emotional state of the avatar every day, so that the SPI emotion state of the avatar can be regularly displayed during the predetermined time interval every day. In the present embodiment, it is assumed that time intervals from 11 a.m. to 1 p.m. and from 5 p.m. to 7 p.m. are set as the time interval for expressing the emotion state of the avatar. Each of the SPI values is accumulated only up to a predetermined limit. When one of the SPI values exceeds the predetermined limit, the avatar growing event model is activated to grow until it reaches a specific growth status named 'ending event'. It is assumed that each of the initial SPI values of the avatar is 300 (S=300, P=300, and I=300). The initial SPI values are values at the first stage when the avatar is selected or the emotion expression event model is activated. Also, when the avatar is replaced by another avatar, the SPI values are reset to be the initial values. Further, it is assumed that the each of predetermined limits for the SPI values has one value between 300 and 1000 and one of predetermined limits has a value of 1000.

Hereinafter, a method for determining the emotion state of the avatar will be discussed.

Figure 10:
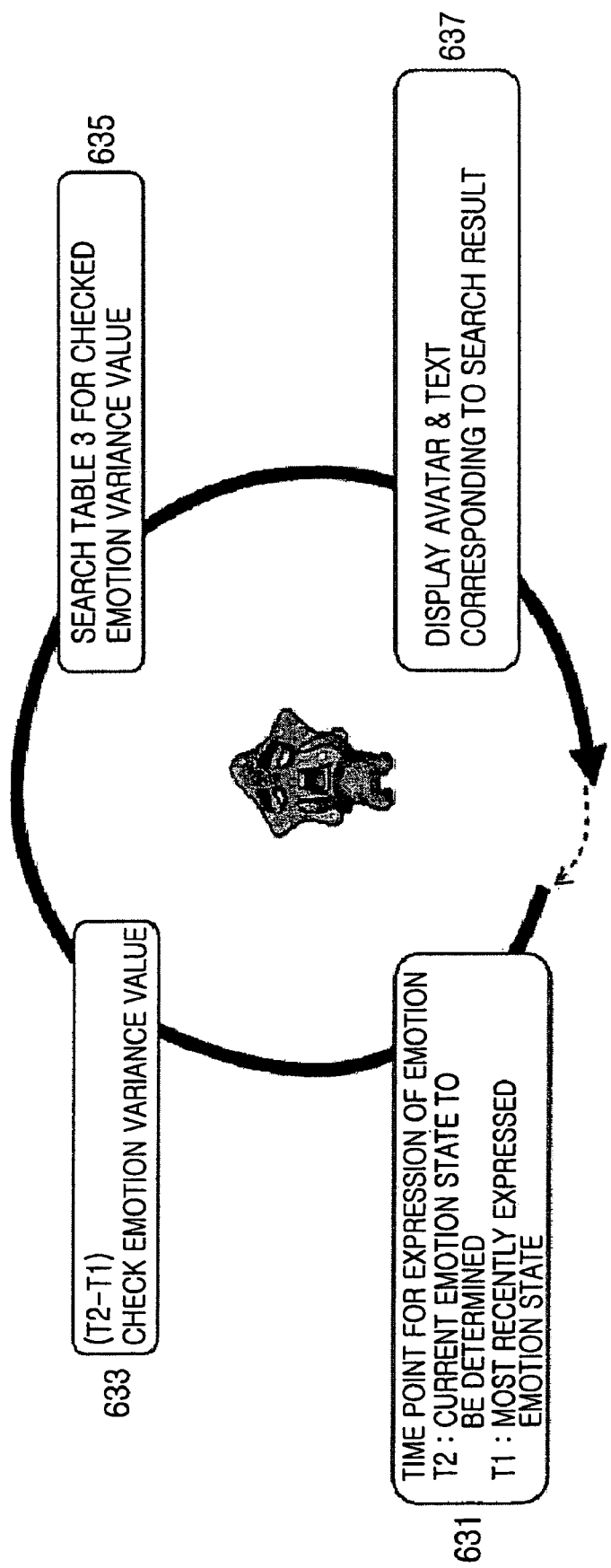
FIG. 10 illustrates a process for determining the emotion state of the avatar at the time point for expressing the emotion state of the avatar according to an embodiment of the present invention.
Figure 11D:
Figure 11E:
Figure 11F:
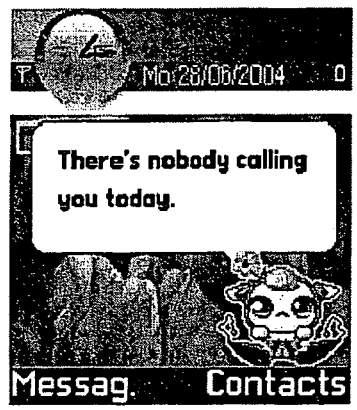

FIG. 10 illustrates a process for determining the emotional state of the avatar at the time point for expressing the emotional state of the avatar, and FIGS. 11A through 11F illustrate examples of five emotional states of the avatar displayed on a screen of the display unit 140 at the time point for expressing the emotional state of the avatar. In the present embodiment, it is assumed that the avatar can express five emotional states of 'sadness (sad)', 'worry', 'normal', 'happiness (happy)' and 'extreme joy (very happy)' as shown in FIGS. 11A through 11F. Avatar action models for expressing such five emotion states are stored in the avatar memory within the memory 130. FIG. 11A illustrates a status of a transition between emotional states of the avatar, FIG. 11B illustrates an avatar model expressing an emotional state of 'extreme joy', FIG. 11C illustrates an avatar model expressing an emotional state of 'happiness', FIG. 11D illustrates an avatar model expressing an emotional state of 'normal, FIG. 11E illustrates an avatar model expressing an emotional state of 'worry', and FIG. 11F illustrates an avatar model expressing an emotional state of 'sadness'.

In expressing the emotional state, it is assumed that the sum of SPI values at the next time point at which the emotion state must be expressed is T2 and the sum of SPI values at the most recent time point at which the emotion state was expressed is T1.

Referring to FIG. 10, when it becomes the time point for expressing the emotional state (that is, when it is a time point between 11 a.m. and 1 p.m. or between 5 p.m. and 7 p.m. or when the user requests expression of the emotion state), the controller 110 detects that it is the time point for expressing the emotional state and obtains an emotion value T2 of the emotional state which must be currently determined and an emotion value T1 of the most recently expressed emotional state (step 631). In step 633, the controller 110 obtains a status value by subtracting the value T1 from the value T2 (T2−T1). In step 635, the controller 110 searches Table 5 for the checked status value. In step 637, the controller 110 accesses an avatar action model image expressing an emotional state corresponding to the search result in the avatar memory within the memory 130 and displays the image on a screen of the display unit 140. As shown in FIGS. 11B thorugh 11F, the controller 110 may display a text corresponding to the emotional state of the avatar together with the avatar image on the screen of the display unit 140. Table 5 below is a table for determining the emotional state of the avatar, in which the difference between T2 and T1 corresponds to one of the emotional states.

TABLE 5

| Condition | Status value (see Table 4 for image Tables 5 and 6 for text, in relation to the output based on the status value) |
|---|---|
| 10 < T2 − T1 | 2 |
| 5 < T2 − T1 ≦ 10 | 1 |
| 0 < T2 − T1 ≦ 5 | 0 |
| −5 < T2 − T1 ≦ 10 | −1 |
| T2 − T1 ≦ −5 | −2 |

Therefore, on the basis of the status value as shown in Table 5, the controller 110 searches the memory 130 for an avatar image for expressing a corresponding avatar emotional state as shown in Table 6 and for a text for expressing the corresponding avatar emotional state as shown in Tables 7, 8A and 8B. The text for expressing the corresponding avatar emotional state is selected from Table 7 and from FIGS. 8A and 8B (each with an opportunity having a probability of 50%) at the instant of expressing the emotion. When there are at least two texts corresponding to the situation, one of the two texts is optionally selected. Specifically, with a cycle of two times, the text is alternately selected once from Table 7 and at the other time from FIGS. 8A and 8B. In the present embodiment, Table 7 may be a text memory for expressing the avatar emotion and FIGS. 8A and 8B may be a text memory for expressing the event emotion.

TABLE 6

| Common use with CBM or not | Action | Status | others |
|---|---|---|---|
| Common | Very happy | Very good | |
| | Happy | Good | |
| | Normal | Normal | |
| | Worry | Bad | |
| | Sad | Very bad | |

TABLE 7

| Emotion states (see Table 2) | Text | Others |
|---|---|---|
| Very happy (2) | What a nice day! I feel so good. | |
| | I feel full of hope. | |
| | Hey! Nice to see you. | |
| Happy (1) | Are you happy too? | |
| | Good luck to you. | |
| | What a great day! | |
| Normal (0) | What's up? | |
| | I need something exciting! | |
| | So so... | |
| Worry (−1) | I am in a slump. | |
| | Please help me cheer up. | |
| | I feel down-hearted and blue. | |
| Sad (−2) | Well, I need to get out of bad mood | |
| | I feel sad. | |
| | I feel terrified. | |

TABLE 8A

| Group | Action | Status value | text |
|---|---|---|---|
| Group 1. (frequently occurring actions) | Camera | 2 | It's the Pulitzer Prize picture! |
| | | 1 | Wow! You are good at taking picture. |
| | | 0 | Say cheese! |
| | | −1 | Hey~let me take some picture of you. |
| | | −2 | Why don't you take some picture? |
| | Transmission of SMS/MMS | 2 | It's new record! You sent lots of messages today! |
| | | 1 | Did you get any reply from your friend? (in transmission of SMS/MMS) |
| | | 0 | Let's send some messages to your friends! |
| | | −1 | Do you have exam or something today? You are not sending few messages today. |
| | | −2 | Aren't you bored? Let's send some messages. |
| | Reception of SMS/MMS/CBM | 2 | You received lots of messages! Were they good messages? |
| | | 1 | Wow! You received lots of messages! |
| | | 0 | Knock, Knock... Aren't there new messages from your friends? |
| | | −1 | I'm anxious to know what your friends are doing these days. |
| | | −2 | I'm bored.. I want to see some new messages. |
| | Incoming call | 2 | You have lots of incoming calls today! Do you have lots of meetings today? |
| | | 1 | Why did your friend call you? |
| | | 0 | Is there a piece of good news from your friend? |
| | | −1 | Your friends must be busy today. Just few friends called you. |
| | | −2 | There's nobody calling you today. |
| | Missed call | −1 | Why didn't you answer the phone, were having an important meeting? |
| | | −2 | You must forgot to take your phone with you. Too many missed calls today. |

TABLE 8B

| Group 2. (rarely occurring actions) | Contact list | Add | You added new contact cards today! Did you meet new friends? |
| --- | --- | --- | --- |
| | | Edit | Hey! You changed some contact information. Something happened? |
| | | Delete | You erased some of your contact cards! Something happed? |
| | Theme | Change theme | You changed theme! Do you like it better? |
| | Camcorder | Use camcorder | Can I see what you've got with your phone camcorder? |
| | New application | installed | You installed new application! How was it? |

In relation to the text expressions as described above, Table 7 shows humorous expressions corresponding to the five emotion states and Tables 8A and 8B show expressions for the user's habit of using the portable terminal until the emotion state of the avatar reaches the corresponding emotion state. Further, the use information as presented in FIGS. 8A and 8B includes a group of frequently occurring actions (group 1 as shown in Table 8A) and a group of rarely occurring actions (group 2 as shown in Table 8B). Here, in outputting the texts as shown in Tables 8A and 8B, the portable terminal gives priority to group 2. By outputting a text of group 2, it is possible to more clearly feedback the user's action. For example, when a change occurs by downloading a new theme, priority is given to group 2 and a text reading "You changed theme! Do you like it better?" is output. Further, when multiple actions of group 2 simultaneously occur, an action having the largest influence on the change of the emotion value is selected.

When no action of group 2 occurred, a text in relation to an action having the largest influence on the change of the emotion value from among the actions of group 1 is selected. In Table 6, a text for an action having the lowest probability is output when the status value is one of −1 and −2, while a text for an action having the highest probability is output when the status value is one of values from 0 to 2.

In order to express the emotion state as described above, the portable terminal checks the emotion value (T2−T1) and then selects an avatar image corresponding to the emotion value. Simultaneously while the emotion state is expressed, a corresponding text selected from Table 7 or Tables 8A and 8B is displayed. The texts of either Table 7 or Tables 8A and 8B may be displayed depending on a predetermined way. In the present embodiment, the displayed text is alternately selected from Table 7 and Tables 8A and 8B. Further, in displaying a text selected from Tables 8A and 8B, the emotional state is first checked (T2−T1) and then it is determined if an action of group 2 has occurred. When an action of group 2 has occurred, a text corresponding to the event having the largest influence on the emotional state is selected from Table 8B and is displayed. In contrast, when no action of group 2 has occurred, a text corresponding to one of the events of group 1 having the largest influence on the emotion state is selected from Table 8A and displayed.

Revision of the Emotion State

In principle, the emotional state is determined based on the use factors of the portable terminal as defined in Table 4. However, from various simulation tests, it has been proven more practical to apply three types of revisions as follows to calculation of the SPI values.

First, it has been proven more effective to provide a weight to each of the SPI values in order to determine a practical emotion state. The basic variance value (1 up to date) for the SPI values defined in Table 4 may be multiplied by the weight value. However, when an event of the portable terminal is processed, a weight may be provided to the emotion variance value of each event as shown in Table 4. In the present embodiment, it is assumed that the weights applied to the SPI values are 1.5, 1 and 1, respectively (S=1.5, P=1, and I=1).

According to the second method, when the user does not use the portable terminal, the time interval during which the user does not use the portable terminal is reflected in the SPI values. In the method of applying the time interval to the SPI values, formulas may be set as shown in Table 9.

TABLE 9

| SPI value | Revision condition for time of non-use | Formula of revision |
| --- | --- | --- |
| S | From the time point after passage of 12 hours without change of S | The following revision value is subtracted from a just previous value of S (S1) at an interval of one hour, after the revision condition is met. Revision value = {S1/(age + 1)}/24 |
| P | From the time point after passage of 12 hours without change of P | The following revision value is subtracted from a just previous value of P (P1) at an interval of one hour, after the revision condition is met. Revision value = {P1/(age + 1)}/24 |
| I | From the time point after passage of 24 hours without change of I | The following revision value is subtracted from a just previous value of I (I1) at an interval of one hour, after the revision condition is met. Revision value = {I1/(age + 1)}/24 |

As Table 4 uses SPI status parameters, Table 9 provides formulas for automatic decrease of the SPI status parameters. For example, when an event requiring change of the emotion value of S does not occur during passage of more than a predetermined time interval (12 hours in the present embodiment), the controller 110 performs calculation of {S1/(age+1)}/24 at an interval of one hour after passage of 12 hours, thereby obtaining the revision value for S. Then, the controller 110 reduces the previous S value (S1) by the revision value. In the calculation formula, parameter 'age' has a value corresponding to days from the day on which the avatar emotion model is set (621 in FIG. 9) to the corresponding day (the day on which revision is performed). The emotion values of P and I also automatically decrease in the same manner as that for the value of S.

According to the third method, the emotion state of the avatar is revised by using an avatar biorhythm model.

In a portable terminal having a function of expressing an avatar emotion, the final emotional state may be determined by properly applying the emotion state revision methods as described above. That is, either all, or two, or one, or none of these three revision methods may be applied to the avatar emotion expression event model. In the present embodiment, it is assumed that all of the three revision methods are applied.

Avatar Emotion Model: Avatar Biorhythm Model

The avatar biorhythm model refers to a model having a biorhythm with a birthday as which the day when the avatar model is set by the user is regarded. The birthday of the avatar may be the day on which an avatar-related agent program mounted in the operating system (OS) of the portable terminal is executed for the first time. Further, the birthday of the user of the portable terminal may be used as the birthday of the avatar biorhythm model. The avatar biorhythm model manages three values of a sensitivity index Sb, a physical index Pb and an intellectual index Ib. The SPI values used for the avatar biorhythm model are managed independently from the SPI values used for the avatar emotion expression event model. That is, the SbPbIb values of the avatar biorhythm model is managed separately from the SPI values of the avatar emotion expression event model. However, the SbPbIb values of the avatar biorhythm model provide a basis for revising the SPI values of the avatar emotion expression event model. P among SPI of the avatar emotion expression event model implies the popularity while Pb of the avatar biorhythm model implies the physical index.

The avatar biorhythm model performs two types of functions as follows. One of the two function is to calculate the three values of the sensitivity index Sb, the physical index Pb and the intellectual index Ib and express the calculated values by a graph. The avatar biorhythm may be selected and executed on the avatar UI (user interface). The other function is to revise the avatar emotion expression event model by using the avatar biorhythm model. The method of determining the biorhythm according to the present embodiment follows a general biorhythm calculation method based on the birthday.

Method of Expressing Biorhythm

Figure 12A:
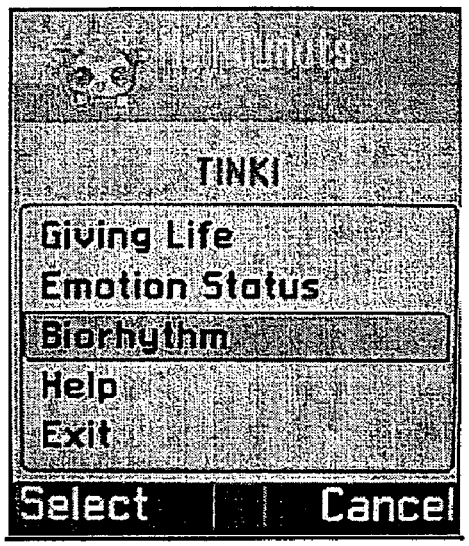
FIGS. 12A and 12B are screens displaying a result of operation of a character biorhythm model according to an embodiment of the present invention.
Figure 12B:
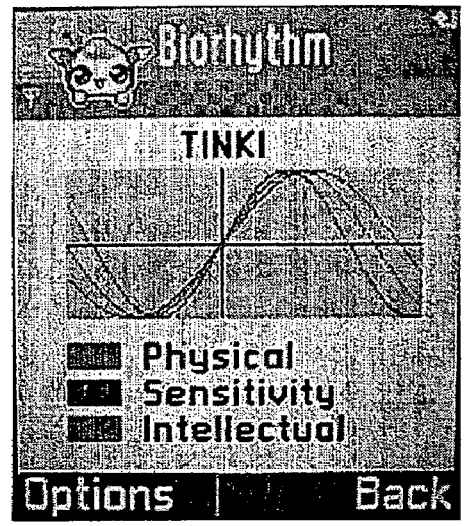

The biorhythm of the avatar can be directly accessed and executed on the avatar UI. That is, the controller 110 can access the biorhythm menu as shown in FIG. 12A according to the user's selection. When a user selects the biorhythm in the menu as shown in FIG. 12A, which is displayed on a screen of the display unit 140, the controller 110 accesses the current biorhythm in the memory 140 and displays it on the display unit 140 as shown in FIG. 12B. The avatar as shown in FIG. 12B has a biorhythm based on the day on which the avatar was set, and the biorhythm value as shown in FIG. 12B has an influence on the SPI emotion values of the avatar. In FIG. 12B, the vertical axis perpendicular to the horizontal axis represents the current status of the biorhythm.

Relation Between Avatar Emotion Expression Event Model and Avatar Biorhythm Model The SbPbIb values of the avatar biorhythm model has an influence on the emotional state of the avatar on the corresponding day. Further, the emotional state of the avatar emotion expression event model can be revised by using the SbPbIb values of the avatar biorhythm model. In the present embodiment, the emotional state of the avatar emotion expression event model is revised by multiplying the SPI values of the avatar emotion expression event model by the SbPbIb values of the avatar biorhythm model. When the SPI values of the avatar emotion expression event model are put as Se, Pe and Ie and the SbPbIb values of the avatar biorhythm model are put as Sb, Pb and Ib, the SPI values Se', Pe' and Ie' of the avatar emotion expression event model revised by the avatar biorhythm model can be obtained in the manner as shown in Table 10 which shows a method for revising the SPI values of the avatar emotion expression event model. Table 11 shows a method of determining the revised biorhythm index.

TABLE 10

Equation for revision of SPI of emotion model

Se' = Se * factor (Sb)
Pe' = Pe
Ie' = Ie * factor (Ib)

TABLE 11

| Condition | Factor (Sb) | Condition | Factor (Ib) |
| --- | --- | --- | --- |
| Emotional rhythm (Sb) >= 80 | 3 | Intellectual rhythm (Ib) >= 80 | 3 |
| Emotional rhythm (Sb) >= 0 | 2 | Intellectual rhythm (Ib) >= 0 | 2 |
| Emotional rhythm (Sb) >= 100 | 1 | Intellectual rhythm (Ib) >= 100 | 1 |

In table 10, factors Sb and Ib represent functions for obtaining values by which the SPI values of the avatar emotion expression event model are multiplied based on the avatar biorhythm values. Table 11 defines the factor functions. As noted from Table 10, in the present embodiment, the emotional rhythm (Sb) of the avatar biorhythm model is used for revising the sense (Se) of the avatar emotion expression event model, the intellectual rhythm (Ib) of the avatar biorhythm model is used for revising the intelligence (Ie) of the avatar emotion expression event model, and the physical rhythm (Pb) of the avatar biorhythm model is used for revising the popularity (Pe) of the avatar emotion expression event model. Here, there is no direct relation between the physical rhythm (Pb) of the avatar biorhythm model and the popularity (Pe) of the avatar emotion expression event model, because the statuses of the avatar intended to be expressed by them are different from each other.

Time Point at which the Emotion State is Expressed

Figure 12C:
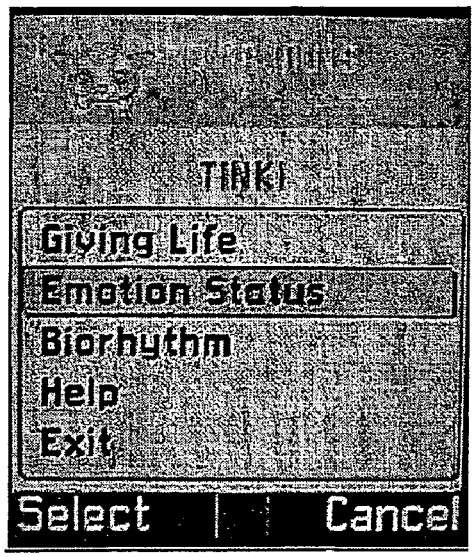
FIGS. 12C and 12D are screens displaying the avatar emotion states by the user's request.
Figure 12D:
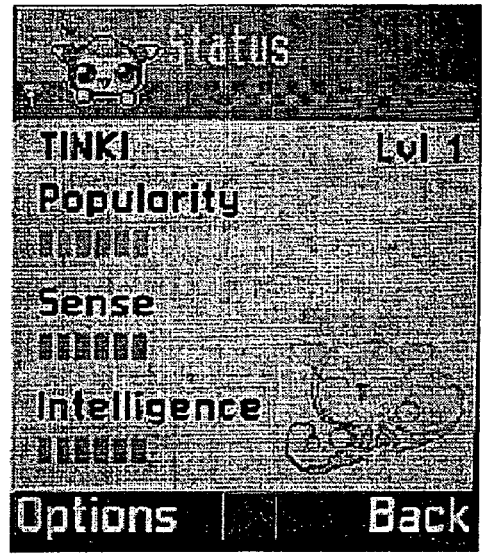

The time point at which the emotion state of the avatar according to use of the portable terminal is expressed can be determined by the user of the portable terminal. In the present embodiment, it is assumed that the emotional state of the avatar is expressed at a predetermined time point within the two time intervals (for example, between 11 a.m. and 1 p.m. and between 5 p.m. and 7 p.m. as described above) every day. In this case, when the user opens a folder of the portable terminal or checks an operation of the portable terminal within the set time intervals, the emotional state is displayed on the display unit of the portable terminal. The user can confirm the emotional state of the avatar through the avatar UI. FIGS. 12C and 12D are views illustrating the avatar emotional state on the avatar UI. Referring to FIGS. 12C and 12D showing a process of accessing an avatar emotional state, the emotional state is first selected from the avatar menu as shown in FIG. 12C, then the controller 110 displays the avatar emotional state on the display unit 140 as shown in FIG. 12D. The displayed avatar emotion state shows the SPI emotion values, an avatar action corresponding to the current emotion value and the level of growth up to the present, as noted from FIG. 12D.

Method of Expressing the Emotion State

Figure 13A:
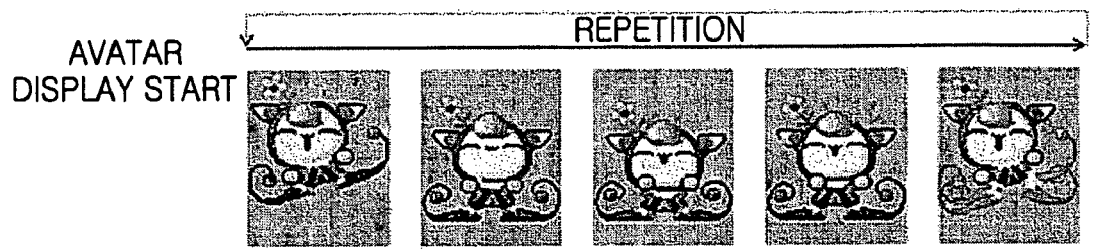
FIGS. 13A and 13B are screens displaying the emotion states of the character emotion model according to an embodiment of the present invention.
Figure 13B:
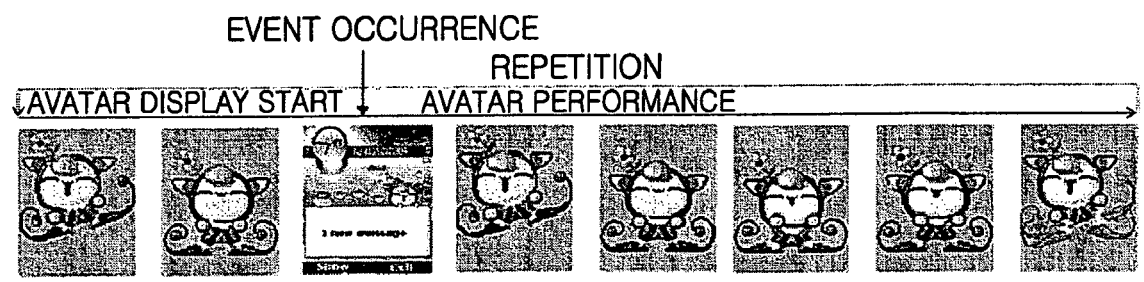

FIGS. 13A and 13B illustrate a method of expressing the emotion state of the avatar.

Referring to FIGS. 13A and 13B, the method in which the avatar expression event model expresses the emotion state is defined for two cases as follows.

The first case corresponds to FIG. 13A showing normal termination in the expression of the avatar emotion, which indicates the output of consecutive action cuts (hereinafter, referred to as animation) of the avatar normally progresses and terminates. That is, all defined action cuts are output in a normal order. The normal termination is performed by a user's operation of the terminal in the course of the output of the animation. After the termination, the screen of the portable terminal restores the original state before the expression of emotion by the avatar was started.

The second case corresponds to the case in which the expression of the avatar emotion is delayed as shown in FIG. 13B. When an event of the portable terminal occurs during the display of the avatar animation, the display of the avatar animation is interrupted and the occurred event is processed and displayed. After the event is processed, the animation expressing the emotion of the avatar continues from the interrupted cut. After normal termination by the user of the portable terminal, the screen of the portable terminal restores the original state before the expression of emotion by the avatar was started.

Avatar Emotion Model: Avatar Growing Event Model

The avatar growing event model refers to a model expressing the changing growth status of the avatar, which reflects the SPI values changing based on the avatar emotion expression event model. The growth status of the avatar includes, in brief, three levels of status each of which can be defined as shown in Table 12. Each level of the growth status has an avatar image set corresponding to the level. When the sum of the SPI values exceeds a first threshold value, the growth status shifts from the first level (LV1) to the second level (LV2). Here, the growth status may shift back from LV2 to LV1 when the sum lowers below the first threshold value. The third level represents a specific level (specifically, an ending level) in which the growth of the avatar is terminated when a term for the growth of the avatar exceeds a predetermined number of days or one of the SPI values exceeds a predetermined value. The present embodiment is based on an assumption that the first threshold for the shift from LV1 to LV2 is 1500, the predetermined number of days for the avatar growth term is 100 days, and the predetermined value is 1000. In the present embodiment, the emotion value of 1500 shown in Table 12 serves as the threshold for the level shift, and the value of 1000 and the 100 days serve as the threshold for ending the growth.

TABLE 12

| Growth status | Condition |
|---|---|
| LV1 | S + P + I (Sense/Popularity/Intelligence) < 1500 (capable of shifting to either LV2 or ending level) |
| LV2 | S + P + I (Sense/Popularity/Intelligence) >= 1500 (capable of shifting to either LV1 or ending level) |
| Ending | When the time interval during which the avatar has been grown reaches 100 days or when one of SPI reaches 1,000. |

Method of Determining the Growth Status

As noted from Table 12, the avatar growing event model defines an avatar of the first level (LV1) of the growth status when the sum of the SPI values is smaller than 1500. The first level (LV1) of the growth status corresponds to the initial status when the user first sets the avatar in the portable terminal. When the sum of the SPI values exceeds 1500, the growth status shifts from the first level (LV1) to the second level (LV2). At the second level (LV2) of the growth status, the avatar image set used at LV1 is replaced by a new avatar image set. The growth status cannot reach LV2 without undergoing LV1. The growth status necessarily undergoes LV1. When the sum of the SPI values decreases below 1500, the growth status may shifts down again from LV2 to LV1. At LV1, the avatar image set used at LV2 is replaced by a new avatar image set.

The last level of the growth status is a specific level to which the growth status may directly shift from either LV1 or LV2. The ending level represents a growth status when 100 days have passed from the initial setting of the avatar or when one of the SPI values reaches 1000. In the ending level, the controller 110 outputs a special ending animation and ending text defined for each avatar. At the ending level, the controller 110 does not use the avatar used at LV1 or LV2 and replaces it by another avatar image set registered in the portable terminal. Therefore, after a message reporting the ending status is output, the avatar emotion expression function of the portable terminal is restarted with a new avatar image set. However, when there remains no new avatar image set for the replacement, the controller 110 restarts the action of the avatar emotion model by reselecting the most-lately used avatar image set.

As described above, there may be three types of inter-level shift in the avatar growth status of the avatar growing event model, which include a shift from LV2 to LV1, shift from LV1 to LV2 and shift from LV2 or LV1 to the ending level. Whenever the shift occurs, a special animation expressing the shift is displayed.

Time Point for Expressing the Growth Status

Figure 14A:
FIGS. 14A-14D illustrate screens displayed when the avatar growing event model of the portable terminal undergoes level shift according to an embodiment of the present invention.
Figure 14B:
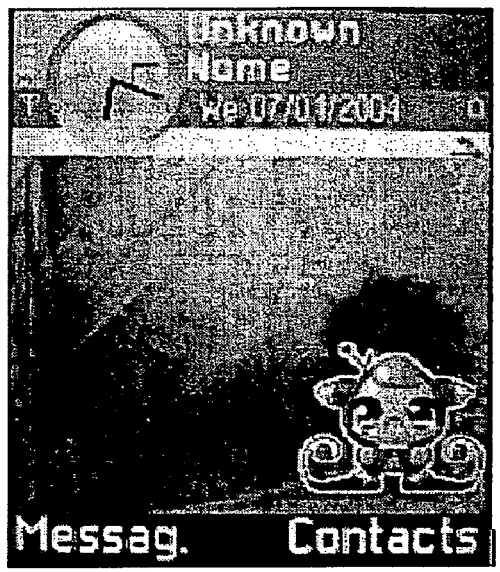
Figure 14C:
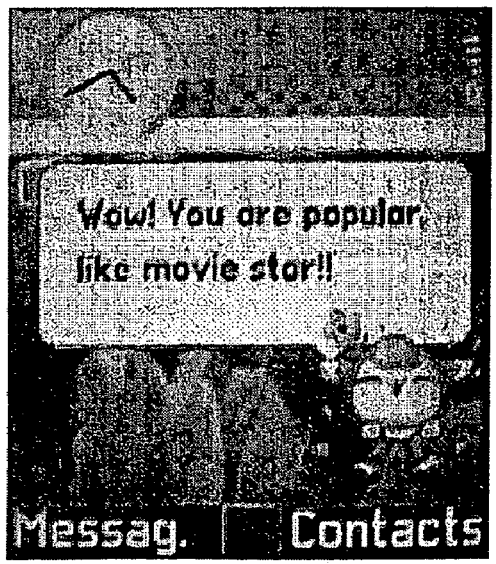
Figure 14D:
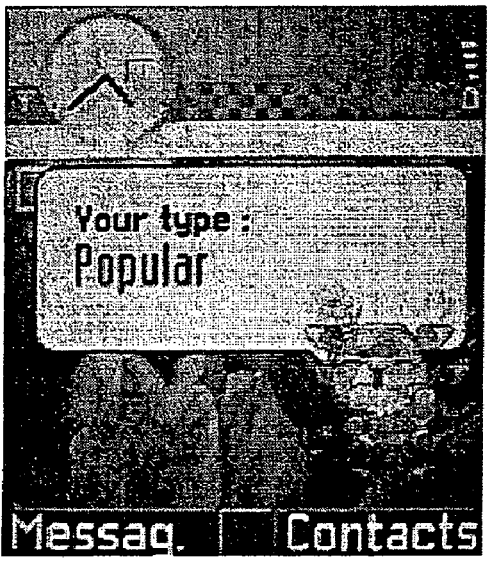

FIGS. 14A and 14B illustrate screens displayed when the avatar growing event model of the portable terminal undergoes a level shift according to an embodiment of the present invention. FIG. 14A illustrates a screen of the display unit 140 when the growth status undergoes level up from LV1 to LV2, and FIG. 14B illustrates the screen of the display unit 140 when the growth status undergoes level down from LV2 to LV1. FIGS. 14C and 14D illustrate examples of ending messages displayed on the display unit 140 at the ending level of the portable terminal.

The growth status is expressed at the time point at which the level shift occurs as well as the same time points as when the emotional state is expressed by the emotion expression event model.

TABLE 13

| Level shift | Time point for expression |
|---|---|
| LV1 → LV2 | When conditions for level shift (Table 8) are satisfied (an animation showing pleasure at development of the growth status is output) |
| LV2 → LV1 | When condition for level shift (Table 8) is satisfied (an animation showing sadness at degradation of the growth status is output) |

TABLE 13-continued

| Level shift | Time point for expression |
|---|---|
| (LV1 or LV2) → Ending | 1. At least one of the SPI values exceeds 1,000 (at the time of reaching)<br>2. When the duration for the growth of the avatar reaches 100 days → at a certain time point between 11:00 and 13:00 at the day when the duration expires. |

Referring to Table 13, when the growth status shifts from LV1 to LV2, the controller 110 accesses an avatar image and text of LV2 within the memory 130 and displays them as shown in FIG. 14A. As noted from FIG. 14A, the display unit 140 displays an avatar animation and text expressing pleasure because the shift from LV1 to LV2 corresponds to development in the avatar growth status. When the growth status shifts from LV2 to LV1, the controller 110 accesses an avatar image and text of LV1 within the memory 130 and displays them as shown in FIG. 14B. As noted from FIG. 14B, the display unit 140 displays an avatar animation and text expressing sadness because the shift from LV2 to LV1 corresponds to degradation in the avatar growth status.

Further, the level shift from LV1 or LV2 to the ending state is executed when at least one of the SPI values exceeds a particular value (1,000 in the present embodiment) or when 100 days have passed from the start of the growth of the avatar. When the level shifts from LV1 to the ending state, the controller 110 expresses the avatar emotion as shown in FIGS. 14C and 14D at the time point at which the growth status shifts to the ending level. When the level shifts from LV2 to the ending state, the controller 110 expresses the avatar emotion at a particular time point within the time interval for expressing the emotion state of the avatar (it is assumed to be a time interval between 11:00 and 13:00 in the present embodiment) on the day of the shift.

When the growth status is at the ending level, the SPI values of the emotion expression event model are analyzed at the time point at which the growth status transited to the ending level and a corresponding text is displayed. Table 14 below shows examples of ending texts displayed together with the avatar animation at the ending level.

The ending text as shown in Table 14 show expressions corresponding to important emotional states causing the ending state, obtained through analysis of the SPI values of the emotion expression event model.

Method for Expressing the Growth Status

The expression of the growth status of the avatar by using the avatar growing event model is based on the avatar expression event model. Here, the expression of the growth status includes expression of the level shift. When performing expression of the avatar emotion expression model by the avatar UI as shown in FIG. 12C, the controller 110 displays the avatar growth status on the screen of the display unit 140 as shown in FIG. 12D. In FIG. 12D, LV1 at the right side represents the growth status of the avatar.

Figure 15A:
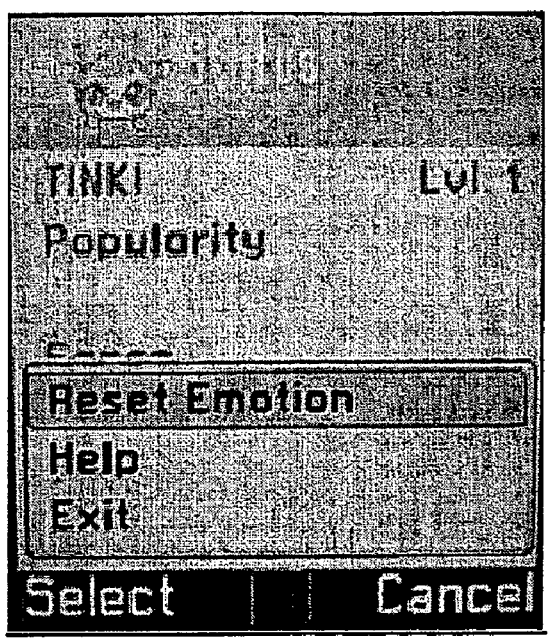
FIGS. 15A and 15B illustrate examples of screens showing menus for initializing the current emotion state of the avatar character set in the portable terminal according to an embodiment of the present invention.
Figure 15B:
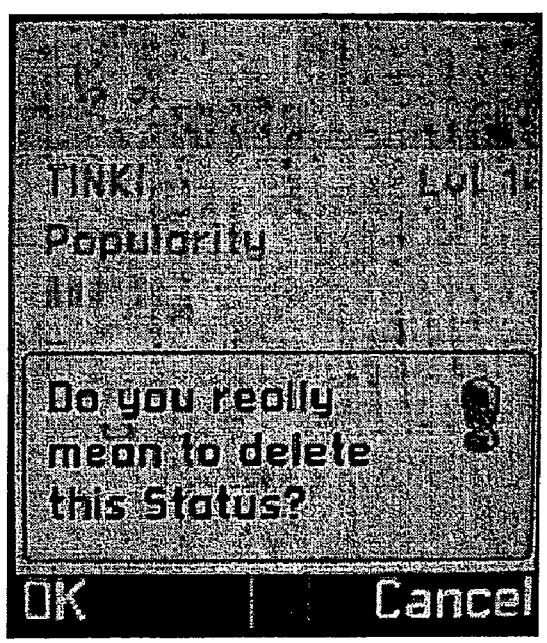

FIGS. 15A and 15B illustrate examples of screens showing menus for initializing the current emotional state of the avatar character set in the portable terminal.

When the avatar emotion value is initialized through the avatar UI as shown in FIG. 15A, the controller 110 controls the display unit 140 to display a screen asking if the user will execute initialization of the avatar. When the user confirms the initialization, the controller 110 initializes all of the currently accumulated SPI emotion values.

Hereinafter, the emotion expressions of the portable terminal according to the second embodiment of the present invention as described above will be discussed in detail. According to the second embodiment of the present invention, the use state of the portable terminal can be expressed by the emotion of the avatar emotion expression event model. In the present embodiment, the use factors of the portable terminal are converted to emotion values by using an avatar emotion expression event model, the emotion values are revised in consideration of a biorhythm model, a weight and a time interval for non-use, and the use state of the portable terminal can be expressed as emotion of an avatar by using the revised emotion value when it is necessary to express the emotion. Further, the use state of the portable terminal can be expressed by using the avatar emotion expression event model. When the emotion value exceeds a predetermined value, the avatar growing event model enables the current avatar image set to be replaced by a new avatar image set, so that the use state of the portable

TABLE 14

| Case | IF | Text | others |
|---|---|---|---|
| Sensitive | S > P, P > I, S − P < P − I | How sensitive you are! | |
| Sensitive | S > P, P > I, S − P ≧ P − I | I want to be sensitive like you!! | |
| Sensitive | S > I, I > P, S − P ≧ I − P | Please tell me how to be sensitive like you!! | |
| Sensitive | S > I, I > P, S − I < I − P | I think you are very sensitive. | |
| Popular | P > S, S > I, P − S < S − I | Wow! You are popular like a movie star!! | |
| Popular | P > I, I > S, P − I < I − S | What's the secret of your popularity? | |
| Popular | P > S, S > I, P − S ≧ S − I | Hey! Can I have your autograph? You are so popular. | |
| Popular | P > I, I > S, P − I ≧ I − S | I want to be popular like you!! | |
| Intellectual | I > P, P > S, I − P < P − S | Hmm.. you are so intellectual! | |
| Intellectual | I > S, S > P, I − S < S − P | Well, you are very intellectual, and also sensitive. | |
| Intellectual | I > P, P > S, I − P ≧ P − S | I want to be intellectual like you! | |
| Intellectual | I > S, S > P, I − S ≧ S − P | I envy you. Can you just tell me how can I become intellectual like you? | | terminal can be expressed by the new avatar image set. Hereinafter, operation according to the second embodiment of the present invention will be discussed in detail.

Figure 16:
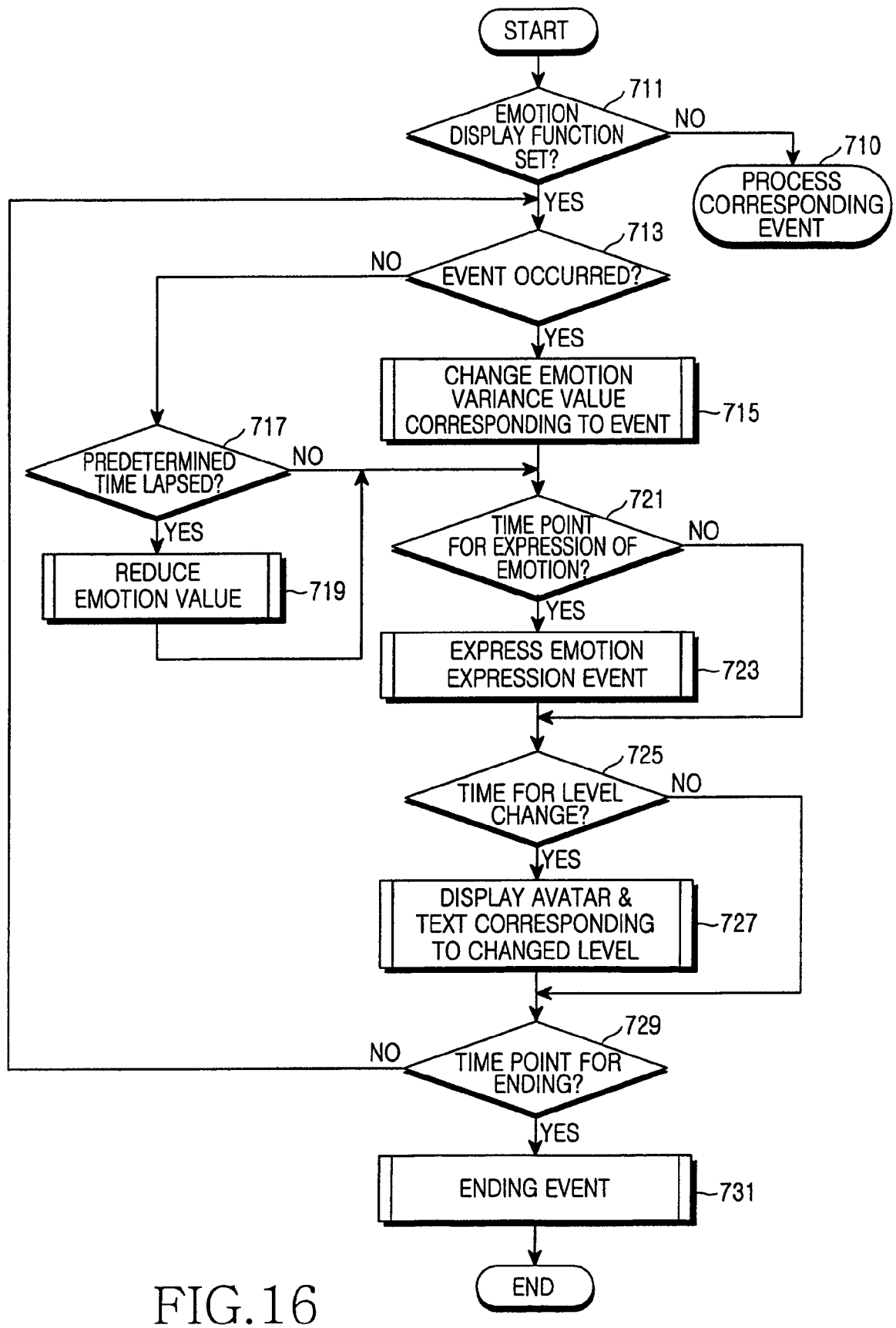
FIG. 16 is a flowchart of a process for expressing the use state of the portable terminal as emotion of an avatar according to the second embodiment of the present invention.

FIG. 16 is a flowchart of a process for expressing the use state of the portable terminal as emotion of an avatar according to the second embodiment of the present invention.

If the user of the portable terminal does not set an emotion display function (emotion off), the controller 110 detects it and performs a process corresponding function in step 710. However, if the user of the portable terminal sets an emotion display function (emotion on), the controller 110 detects it and operates an avatar emotion model in step 711. Thereafter, the controller 110 processes occurring events while controlling the operation of the portable terminal. When an event occurs, the controller 110 detects it in step 713 and confirms an emotion variance value corresponding to the occurred event and changes emotion value of the portable terminal by the emotion variance value in step 715. When no event occurs, the controller 110 examines if there has been no change in the emotion value during a preset time interval in step 717. When there has been no change in the emotion value during a preset time interval, the controller 110 reduces the emotion value by a preset emotion variance value in step 719.

When it becomes a time point for expression of the emotion while the event is processed, the controller 110 detects it in step 721. Then, the controller 110 confirms a currently accumulated emotion value, accesses an avatar image expressing emotion corresponding to the confirmed emotion value, and displays the accessed avatar image on the screen of the display unit in step 723. Here, the controller 110 may express the emotion of the avatar either at a preset time point every day or according to the user's selection.

The operation as described above is performed by the avatar expression event model. The avatar expression event model expresses the change of the emotional state of the avatar defined based on the user's habit of using the portable terminal in a short term. The avatar expression event model defines a function in which emotion variance values corresponding to events occurring during the operation of the portable terminal are accumulated into the emotion value of the portable terminal and an avatar image corresponding to the accumulated emotion value is selected and displayed at the time of expressing the emotion. The avatar emotion model may further include an avatar biorhythm model, so that the avatar expression event model may be revised based on a biorhythm of the avatar biorhythm model.

The controller 110 compares and analyzes the accumulated emotion value. Here, when the accumulated emotion value exceeds a preset value, the controller 110 detects it is time when level shift is necessary in step 725 and accesses an avatar image and text according to the level shift in the memory 130 and displays the image and text on the screen of the display unit 140 in step 727. The controller 110 replaces the avatar image set of the avatar emotion expression event model by a new avatar image set. Further, the controller 110 analyzes the emotion value and the number of days during which the avatar emotion expression event model has been operated. When the emotion value exceeds a preset value or when the number of days during which the avatar emotion expression event model has been operated exceeds a preset number of days, the controller 110 determines that it is time to end the operation of the avatar emotion model in step 729. In step 731, the controller 110 accesses the avatar image and text for the ending event and displays them on the screen of the display unit 140. Also, in step 731, the controller 110 initializes all the emotion values accumulated to date and prepares operation of a new avatar emotion model by setting a new avatar image set except for the avatar image set already used for the previous avatar emotion model.

The short-term emotion states expressed by the avatar emotion expression event model are accumulated as described above. The avatar growing event model defines a change of the growth status of the avatar resulted from the accumulation of the emotion states. In using the avatar growing event model, when the accumulated emotion value of the avatar emotion expression model exceeds a preset threshold value, a level shift is executed and displayed and a new avatar image set is prepared to be used as the avatar emotion expression event model. The emotion values have two status parameters. When one of the parameters exceeds a preset threshold value, the avatar growing event model determines that it is time to end the operation. When a predetermined number of days have passed after the avatar emotion model is set, the avatar growing event model determines also that it is time to end the operation. When it is time to end the operation, the avatar growing event model initializes all the emotion values accumulated to date and sets a new avatar image set.

Hereinafter, operations of the avatar emotion expression event model and the avatar growing event model are discussed in sequence.

Figure 17:
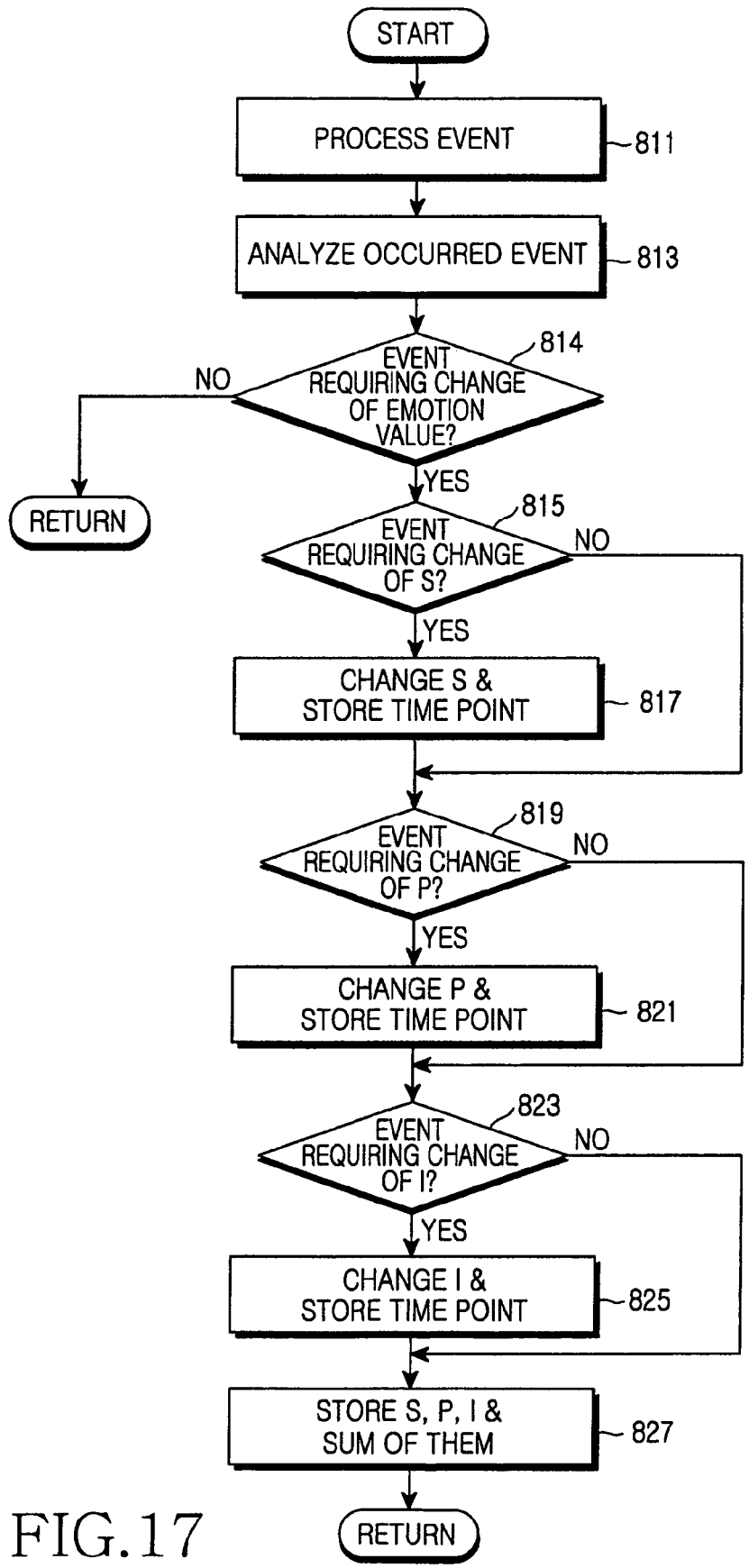
FIG. 17 is a flowchart of the process for changing the emotion value according to events in a step of FIG. 16.

FIG. 17 is a flowchart of the process for changing the emotion value according to events in step 715 of FIG. 16. The process of FIG. 17 is performed by the avatar emotion expression event model.

When an event requiring change of the emotion value occurs, the controller 110 processes the event in step 811 and analyzes the emotion variance value corresponding to the event by using Table 4 stored in the memory 130 in step 813. Table 4 is an emotion value table for the events, which shows emotion variance values for the status parameters of sense S, popularity P and intelligence I. Table 4 may include another status parameter although it shows only the SPI emotion values therein. After the analysis of the event, the controller 110 determines by referring to Table 4 if the event is an event having influence on the emotion value, that is, if the event is an event registered in Table 4. When the event is not an event having influence on the emotion value, that is, when the event is not an event registered in Table 4, the controller 110 proceeds to step 721 of FIG. 16.

When the event is determined as an event having influence on the emotion value in step 814, the controller 110 checks the status parameter relating to the emotion value to be changed, changes the emotion value, and stores the time point at which the emotion value is changed in steps 815 through 825. The time point of the change of the emotion value is stored to use the time point as a reference point for the automatic reduction of the emotion value. The automatic reduction of the emotion value will be discussed again with reference to FIG. 20. When the occurred event is, for example, an addition of a contact card in a phone book, the controller 110 performs the addition of the contact card in step 811, determines that the event requires change of the status parameter I in step 823, and increases the emotion value I by 1 in step 825. When the event is reception of an MMS message, the controller 110 receives the MMS message in step 811, determines that the event requires change of the status parameters S and P in steps 815 and 819, and increases the emotion values S and P each by 1 in steps 817 and 821. As described above, when an event occurs, the controller 110 processes the event, sets the status parameter to be changed and a corresponding emotion value by referring to Table 4, and changes the emotion value of the corresponding status parameter. Thereafter, the controller 110 stores the emotion value of the changed status parameter together with the sum of the emotion values of the SPI status parameters in step 827. The sum of the emotion values of the SPI status parameters is stored to use the sum in selecting an avatar model expressing the emotional state of the portable terminal at the time point for expression of the emotion.

Figure 18:
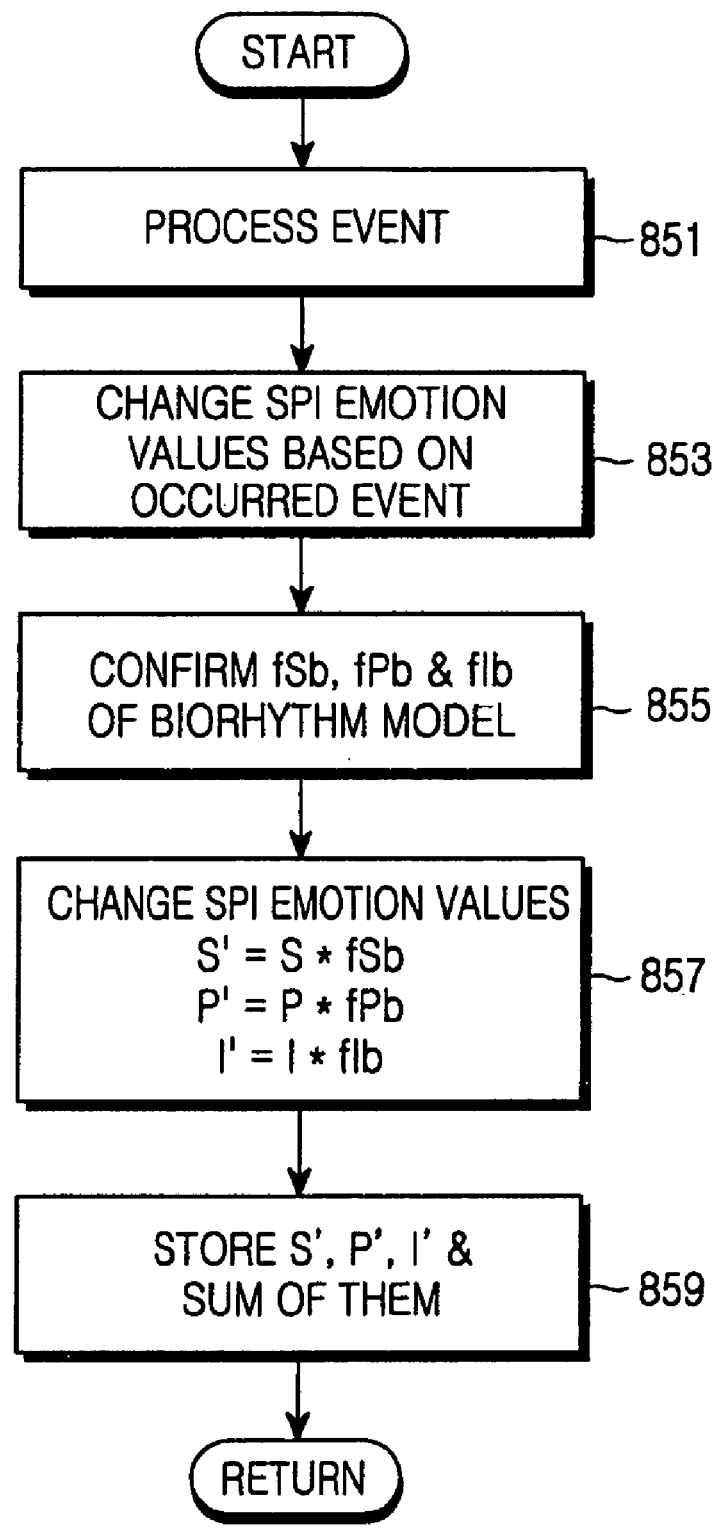
FIG. 18 is a flowchart of a process for revising the emotion values of the SPI status parameters by using the biorhythm index of the avatar biorhythm model.
Figure 19:
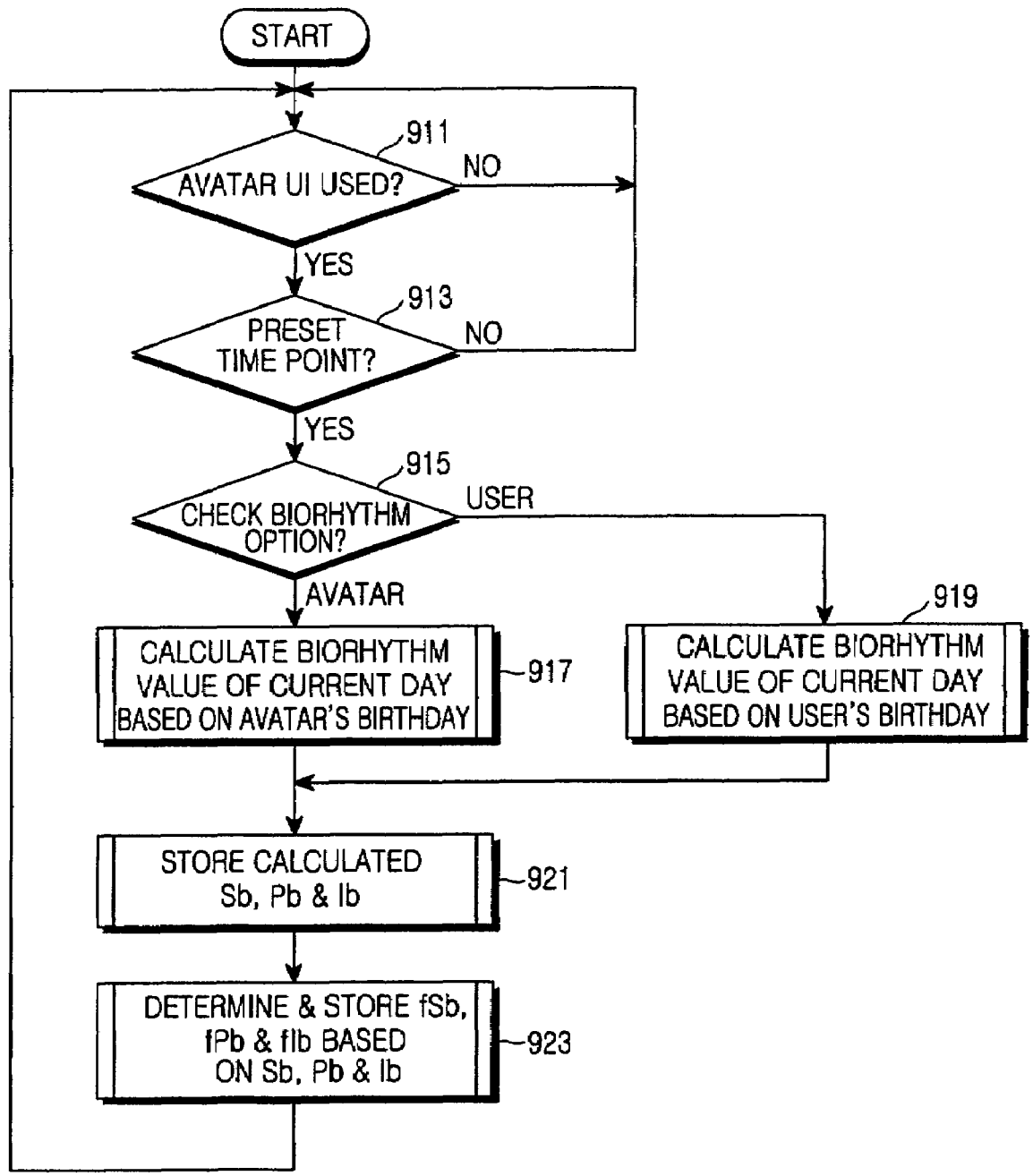
FIG. 19 is a flowchart of a process for determining a biorhythm index of the avatar biorhythm model.

The change of the emotion values according to events in step 715 of FIG. 16 is performed according to the process shown in FIG. 17 which depends only on the emotion values in Table 4. However, the emotion values of the SPI status parameters obtained through the process shown in FIG. 17 may be revised by using the biorhythm index of the avatar biorhythm model. FIG. 18 is a flowchart of a process for revising the emotion values of the SPI status parameters (obtained from the avatar emotion expression event model) by using the biorhythm index of the avatar biorhythm model. FIG. 19 is a flowchart of a process for determining a biorhythm index of the avatar biorhythm model.

Referring to FIG. 19, the process for determining a biorhythm index of the avatar biorhythm model is regularly performed at a preset time point every day. The biorhythm can be set only in a portable terminal using an avatar UI. Therefore, the controller 110 detects use of the avatar UI in step 911 and determines if it is time for change of the biorhythm index in step 913. It is assumed that the preset time for change of the biorhythm index is 9 a.m. When it is time for change of the biorhythm index, the controller 110 detects it in step 913 and checks the biorhythm option (step 915). The checking of the biorhythm option refers to checking if the biorhythm is that of the avatar or the user. When the biorhythm option is set as a biorhythm of the avatar, the biorhythm is calculated based on the first day when the avatar was set in the portable terminal. When the biorhythm option is set as the user's biorhythm, the biorhythm is calculated based on the user's birthday input by the user.

When the biorhythm option is set as a biorhythm of the avatar, the controller 110 calculates the biorhythm based on the first day when the avatar was set in the portable terminal in step 917. The biorhythm has three indexes including a sensitivity index, a physical index and an intellectual index, which can be calculated by Equation (1) below.

$$Pb = \sin(2\pi/7 * (daymod7)) * 100$$
$$Sb = \sin(2\pi/6 * (daymod6)) * 100 \quad (1)$$
$$Ib = \sin(2\pi/5 * (daymod5)) * 100$$

In Equation (1), the numbers 5, 6 and 7 refer to the number of days used in operation of the biorhythm indexes, mod refers to the modulo operation, and 100 refers to a scale. Therefore, as noted from Equation (1), the physical index Pb has a cycle of 7 days, the sensitivity index Sb has a cycle of 6 days, and the intelligence index Ib has a cycle of 5 days.

When the biorhythm option is set as the user's biorhythm, the controller 110 calculates the biorhythm based on the user's birthday in step 919. Thereafter, the controller 110 stores the calculated biorhythm indexes Pb, Sb and Ib in the memory 130 in step 921 and calculates biorhythm indexes fPb, fSb and fIb for revision of the status parameters SPI of the avatar emotion expression event model in step 923. Here, the biorhythm indexes fPb, fSb and fIb are calculated by using Tables 10 and 11. However, the status parameter P of the emotion expression event model represents the popularity while the biorhythm index Pb represents the physical index. Therefore, the two parameters do not have direct relation because they are intended to express different avatar status. In the present embodiment, it is assumed that the biorhythm index Pb is not used. The biorhythm indexes fSb and fIb for revision of the SPI parameters of the avatar emotion expression event model are set based on values of the biorhythm curve as shown in FIG. 12B. Therefore, when Sb and Ib are not smaller than 80, fSb and fIb are set as 3. When Sb and Ib are not smaller than 0, fSb and fIb are set as 2. When Sb and Ib are not smaller than −100, fSb and fib are set as 1. The controller 110 stores the obtained biorhythm indexes fPb, fSb and fIb.

In the state in which the biorhythm indexes fPb, fSb and fIb has been obtained through the process as shown in FIG. 19, when an event occurs, the controller 10 changes the SIP emotion value based on the event by performing the process as shown in FIG. 18. That is, when the event occurs, the controller 110 processes the event in step 851 and obtains the SPI emotion values corresponding to the event in step 853. Here, step 853 is performed in the same manner as that in steps 813 through 825. Thereafter, the controller 110 revises the SPI emotion values of the emotion expression event model (obtained in step 853) by using the biorhythm indexes fPb, fSb and fIb in step 855. The revision of the emotion values in step 855 is performed by using the equations as shown in Table 10. Here, the popularity does not have influence on the revision of the emotion value. The sense S and intelligence I are revised by using the biorhythm indexes fSb and fIb. When the biorhythm indexes fSb and fIb are 3, the emotion values of the sense S and intelligence I are trebled. When the biorhythm indexes fSb and fIb are 2, the emotion values of the sense S and intelligence I are doubled. When the biorhythm indexes fSb and fIb are 1, the emotion values of the sense S and intelligence I are maintained as they are. After revising the SPI emotion values of the emotion expression event model by using the biorhythm indexes fSb and fib in step 857, the controller 110 stores the revised SPI emotion values together with their sum in the memory 130.

In the present embodiment, the SPI emotion values of the emotion expression event model may be revised by multiplying factors determined based on the values SbPbIb of the avatar biorhythm event model.

Further, the revision may be performed by applying a larger weight to one of the SPI emotion values of the emotion expression event model. In the present embodiment, the revision may be performed by applying a larger weight to the sense S. For example, a weight of 1.5 may be applied to S (S'=1.5*S) while a weight of 1 is applied to P and I.

Figure 20:
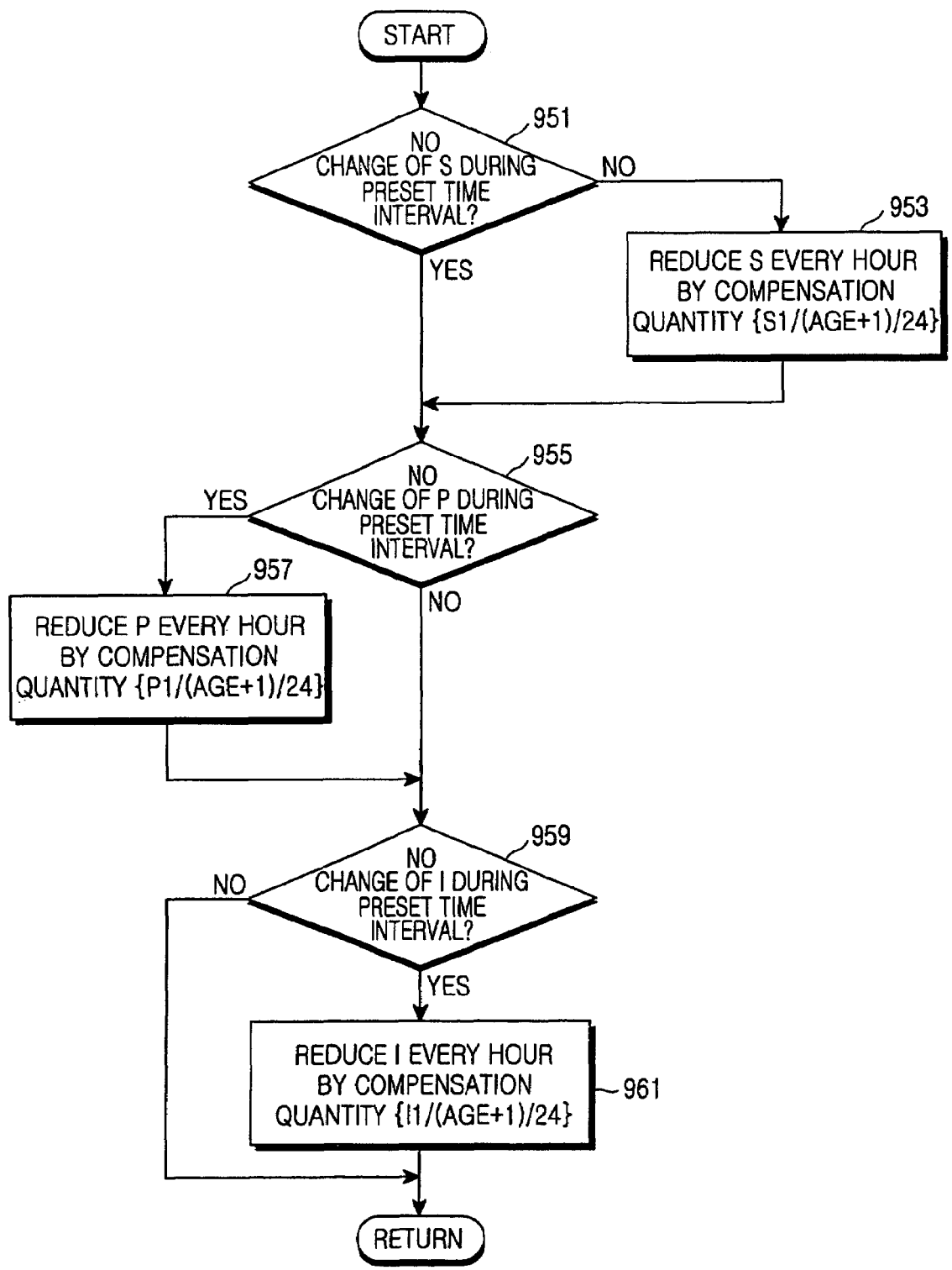
FIG. 20 is a flowchart of a process for automatically reducing the emotion values when the SPI values of the avatar emotion expression event model do not change during a preset time interval.

According to another embodiment of the present invention, when the SPI values of the avatar emotion expression event model do not change during a predetermined time interval, that is, when an event requiring change of the SPI emotion value does not occur during a predetermined time interval, the SPI values are automatically revised. FIG. 20 is a flowchart of a process for automatically reducing the emotion values when the SPI values of the avatar emotion expression event model do not change during a preset time interval.

Referring to FIG. 20, when no event occurs, the controller 110 checks the time interval set for change of the values of the sense S, popularity P and intelligence I. Here, it is assumed that the preset time interval is 12 hours. Therefore, when 12 hours have passed without change of an emotion value, the controller 110 automatically reduces the emotion value based on a preset formula. First, when 12 hours have passed without change of S, the controller 110 determines that condition for the revision of S has been satisfied in step 951 and reduces S by the preset revision quantity ((S1/(age+1)/24) every one hour (step 953). That is, when 12 hours have passed without change of S, the controller 110 reduces S by a regular revision quantity every hour. In the preset revision quantity, S1 refers to the emotion value of S at the just previous time (just one hour prior) and 'age' refers to days from the setting of the avatar to the current day. At the day of avatar setting, 'age' is zero.

Second, when 12 hours have passed without change of P, the controller 110 determines that condition for the revision of P has been satisfied in step 955 and reduces P by the preset revision quantity ((P1/(age+1)/24) every one hour in step 957. P1 refers to the emotion value of S at the just previous time. Third, when 12 hours have passed without change of I, the controller 110 determines that condition for the revision of I has been satisfied in step 959 and reduces I by the preset revision quantity ((I1/(age+1)/24) every one hour in step 961. I1 refers to the emotion value of I at the just previous time. The automatic reduction of P and I progresses in the same way as that of S.

As noted from the above description, the automatic reduction is performed independently for the SPI emotion values. Therefore, when only a particular event repeatedly occurs, the emotion value corresponding to the particular event may continuously increase while the other emotion values automatically decrease due to no change thereof for long time.

As described above, a larger weight may be applied to a particular one of the SPI status parameters, in order to enhance reality in expressing the emotion state of the portable terminal. In the present embodiment, a weight of 1.5 is applied to the sense S while a weight of 1 is applied to the popularity P and intelligence I. In other words, a larger weight is applied to the sense S.

According to the present embodiment, in the expression by the avatar emotion expression event model, the use factors of the portable terminal are analyzed and corresponding emotion values are updated based on the analysis of the use factor. The updated emotion values may be revised by the following methods. According to the first method, the emotion value is revised by using the avatar biorhythm model. According to the second method, the time point of change of the emotion value is checked and the emotion value is reduced when predetermined time has passed without change of the emotion value. According to the second method, the emotion value is revised by applying a larger weight to a particular one of the emotion values. Either all, or at least one, or none of the above-mentioned methods may be employed according to embodiments of the present invention.

Figure 21:
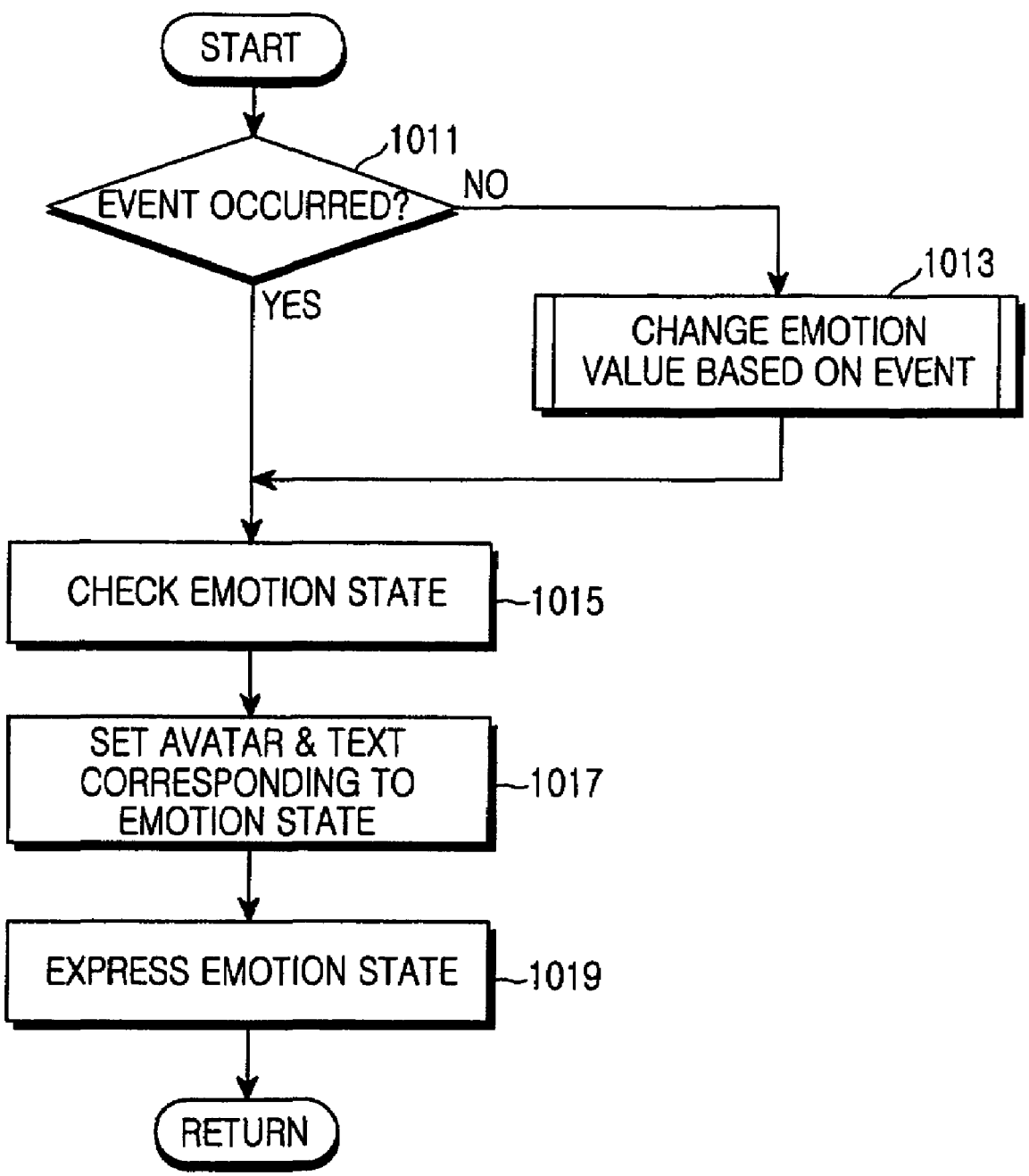
FIG. 21 is a flowchart of a process for expressing an emotion state of the portable terminal according to an embodiment of the present invention.

In the state in which the emotion values have been changed as described above, when it becomes time for expression of the emotion or when the user requires expression of the emotion, the controller 110 detects it in step 721 and expresses the emotion according to the process as shown in FIG. 21 in step 723. FIG. 21 is a flowchart of a process for expressing an emotional state of the portable terminal according to an embodiment of the present invention.

Referring to FIG. 21, at the time point for expression of the emotion, the controller 110 determines if an event has occurred. When the event has occurred, the controller 110 detects it in step 1011 and changes the emotion value based on the event in step 1013. The operation in step 1013 is performed in the same manner as the process shown in FIG. 17 or FIG. 18.

After performing step 1013 or when no event has occurred, the controller 110 checks the current emotion state of the portable terminal. Checking the current emotional state of the portable terminal is performed by checking the accumulated SPI emotion values while processing the event in step 1015. Thereafter, the controller 110 selects an avatar image and text corresponding to the confirmed emotion state in step 1017 and displays the selected avatar image and text as the emotional state of the portable terminal in step 1019.

Figure 22:
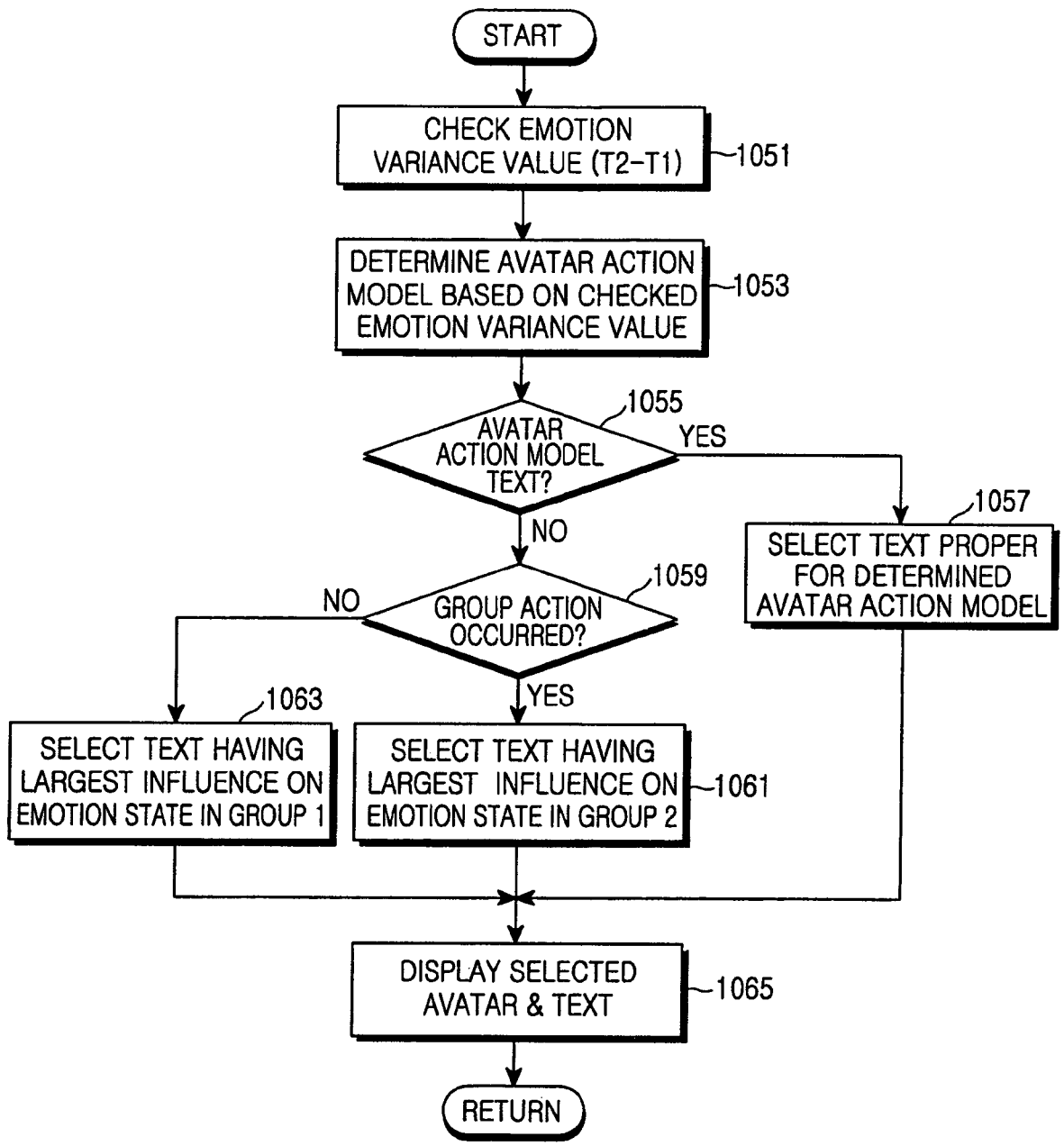
FIG. 22 is a flowchart of a process for analyzing the emotion state of the portable terminal based on the accumulated emotion values and displaying an avatar and text based on the analysis.

The process from step 1015 through step 1019 in FIG. 21 in order to show the emotional state of the portable terminal can be performed according to a process shown in FIG. 22. FIG. 22 is a flowchart of a process for analyzing the emotional state of the portable terminal based on the accumulated emotion values and displaying an avatar and text based on the analysis.

Referring to FIG. 22, the emotion state of the portable terminal is confirmed by the sum of the SPI values. In step 1051, the controller 110 confirms a sum T1 of the SPI values at the most recently expressed emotional state and a sum T2 of the SPI values at the current emotional state as shown in FIG. 10. That is, the controller 110 obtains a sum of the values T1 and T2 at respective emotion states. The controller 110 subtracts T1 from T2 in order to check the emotion value. Then, the controller 110 searches Table 5 for the checked emotion value in step 1053. Table 5 is a table for determining the emotional state in which each of emotion values corresponds to the difference between T2 and T1. The values (10, 5, 0, −5 and −10) used in Table 5 are determined from experiments. The status values of the emotion states are expressed as 2, 1, 0, −1 and −2, which correspond to 'very happy', 'happy', 'normal', 'worry' and 'sad', respectively.

After checking the current emotional state of the portable terminal as described above, the controller 110 determines an avatar image corresponding to the determined emotional state of the portable terminal. The avatar image corresponding to the emotion state is selected from among the images of the five emotional states as shown in FIGS. 1B through 11F. Thereafter, the controller 110 determines a text corresponding to the determined avatar emotion state while performing steps 1055 through 1063.

The text displayed together with the avatar action model expressing the determined avatar emotion state may contain emotion expressions of the avatar image as shown in Table 7 or emotion expressions as shown in Tables 8A and 8B. As described above, the emotion expressions of the avatar image as shown in Table 7 and the emotion expressions as shown in Tables 8A and 8B may be alternately selected. For example, when the emotion state is expressed twice a day (between 11:00 and 13:00 and between 17:00 and 19:00), the controller 110 selects text corresponding to the emotional state from Table 7 at the first expression time point and a text corresponding to the emotional state from Tables 8A and 8B at the second expression time point. Table 8A contains texts of frequently occurring events (group 1) and Table 8B contains texts of rarely occurring events (group 2). Therefore, in expressing the texts in Tables 8A and 8B, a text is selected from group 2 when an event belonging to group 2 occurs and is selected from group 1 when an event belonging to group 1 occurs. Further, when multiple events have occurred, a text in relation to the event having the largest influence on the emotional state is selected from among the texts.

Then, the controller 110 determines if the text to be currently displayed is a text for an emotion expression of the avatar image as shown in Table 7 in step 1055. When the text to be currently displayed is a text for an emotion expression of the avatar image, the controller 110 selects text corresponding to the determined emotion state from the texts for expression of the avatar emotion in Table 7 in step 1057. For example, when the avatar emotion state is 'very happy', the controller 110 selects one text from among "What a nice day! I feel so good", "I feel full of good", and "Hey! Nice to see you." Here, the texts may be alternately displayed. For example, the text "I feel full of good" may be displayed for the second-time emotion state of 'very happy' after the text "What a nice day! I feel so good" was once displayed. In this case, after displaying a corresponding text, the controller 110 registers the display of the corresponding text, so that it can display another text next time.

When the text to be currently displayed is not a text for an emotion expression of the avatar image from the determination in step 1055, the controller 110 selects a text from Table 8A in step 1063. From among the texts in Table 8A, the controller 110 selects a text having the largest influence on the change of the emotion value based on the emotional state of the avatar. When the current emotional state has a status value of +2 or +1, an event having the largest affirmative influence on the emotion value is selected. When the current emotion state has a status value of −2 or −1, an event having the largest negative influence on the emotion value is selected. For example, when the text having the largest influence on the change of the emotion value is reception of the SMS message and the current emotional state has a status value of 2, the controller 110 selects the text "You received lots of messages! Were they good messages?". Also, when the text having the largest influence on the change of the emotion value is a missed call and the current emotional state has a status value of −1, the controller 110 selects the text "Why didn't you answer the phone, were you having an important meeting?". After selecting the text corresponding to the emotional state, the controller 110 displays the avatar action model together with the selected text on the screen of the display unit 140.

Therefore, the user of the portable terminal can confirm the current emotional state of the portable terminal from the avatar and text displayed on the display unit 140. The avatar emotional state may be expressed by an avatar animation and the text may be displayed in a balloon on the screen. When the emotion state is "very happy", the display unit 140 may display the avatar animation as shown in FIG. 13A together with the selected text in a balloon on the screen. When an event occurs in the state in which the avatar emotion is expressed, the controller 110 sequentially displays cuts of the emotional state of the avatar while processing the occurred event. When the user stops the expression of the avatar emotion or a predetermined time interval has passed, the display is ended.

The emotional state of the avatar as described above grows. In order to express the growth of the emotional state, at least two avatar image sets are used. Specifically, when the emotion value of the portable terminal exceeds a preset value, the growth status of the avatar undergoes level shift and the avatar emotion expression event model is operated with a new avatar image set. In the present embodiment, the SPI emotion values are summed and the level shift is performed when the sum of the SPI values exceeds a preset value. The present embodiment is based on an assumption that two avatar image sets are used and the maximum of each of the SPI values is 1000. Also, it is assumed that the level shift occurs when the sum of the SPI values exceeds 1500. The avatar growing event model according to the present embodiment processes the level shift (level up or down) and the ending level as shown in Tables 12 and 13. Whether to perform the level shift or not is determined based on the sum of the SPI values. The process at the ending level is performed when one of the SPI values exceeds a preset value (1000 in the present embodiment) or when a preset number of days (100 days in the present embodiment) have passed from the first day of the avatar growth. In relation to the avatar growing event model, the level shift is first discussed and the process at the ending level is then discussed.

Figure 23:
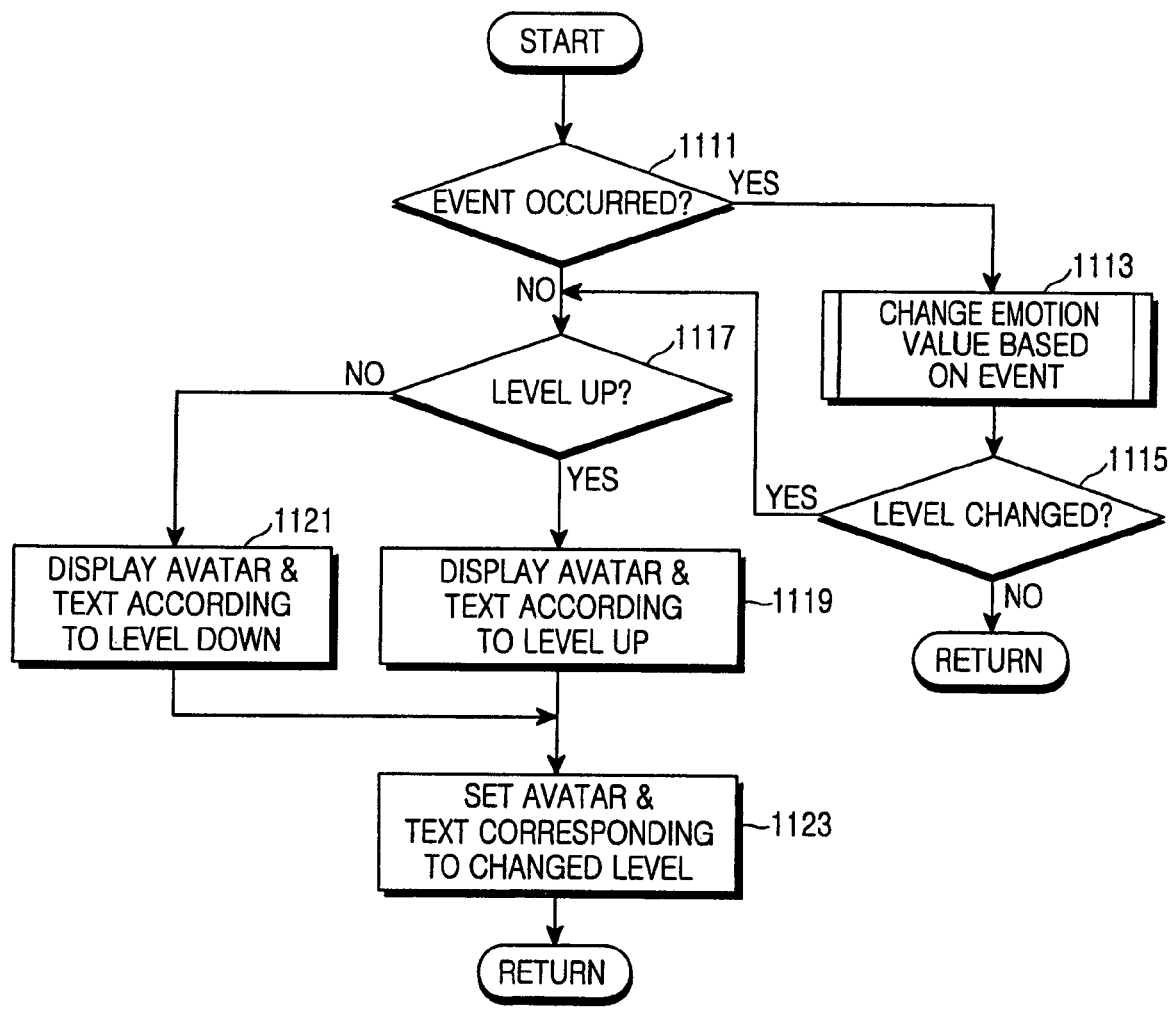
FIG. 23 is a flowchart of the process for the level shift in the portable terminal according to an embodiment of the present invention.

First, if the controller 110 has detected it is time when level shift is necessary step 725, it implies that the sum of the SPI values exceeds 1500. Then, the controller 110 performs the level shift in step 727 by performing the process as shown in FIG. 23 which is a flowchart of the process for the level shift in the portable terminal according to an embodiment of the present invention.

When an event occurs at the time point of the level shift, the controller 110 detects it in step 1111 and changes the emotion values based on the occurred event in step 1113. Then, the controller 110 determines if it is the time point for level shift by checking the sum of the changed emotion values in step 1115. When it is not the time point for level shift, the controller 110 detects it in step 1115 and does not perform the process for the level shift.

When it is the time point for level shift, the controller 110 determines if the necessary level shift is level up in step 1117. When the necessary level shift is level up (level shift from LV1 to LV2, that is, when the sum of the SPI values exceeds 1500), the controller 110 accesses an avatar image and text corresponding to the level up and displays them on the screen of the display unit 140 in step 1119. The avatar image and text corresponding to the level up would be a pleased avatar animation and affirmative text as shown in FIG. 14A because the level up corresponds to an upgrade of the growth status. When the necessary level shift is level down (level shift from LV2 to LV1, that is, when the sum of the SPI values lowers below 1500), the controller 110 accesses an avatar image and text corresponding to the level down and displays them on the screen of the display unit 140 in step 1121. The avatar image and text corresponding to the level down would be a sad avatar animation and negative text as shown in FIG. 14B because the level down corresponds to a downgrade of the growth status.

After displaying the avatar animation and text according to the level up or down on the display unit 140 as described above, the controller 110 sets an avatar image set of the shifted level and ends the process in step 1123. While the avatar emotion state is displayed as described above, the emotion state of the portable terminal changes and the avatar of the portable terminal grows. The growth status may undergo level up (from LV1 to LV2) or level down (from LV2 to LV1). When the level shift occurs as described above, the avatar animation and text reporting the level shift are displayed and the avatar image is replaced by a new avatar image set corresponding to the changed level.

In relation to the avatar growing event model, when one of the emotion values exceeds a preset value or when a predetermined number of days have passed from the day of setting the avatar, the growth of the avatar is ended. The present embodiment is based on an assumption that the emotion of the portable terminal is expressed by SPI values and the SPI values are set to have maximum values at which the avatar growth is terminated. Therefore, when one of the SPI values exceeds 1000, the controller 110 ends the process of growing the avatar. Also, when 100 days have passed from the day of starting the growth of the avatar, the controller 110 ends the growth of the avatar.

Figure 24:
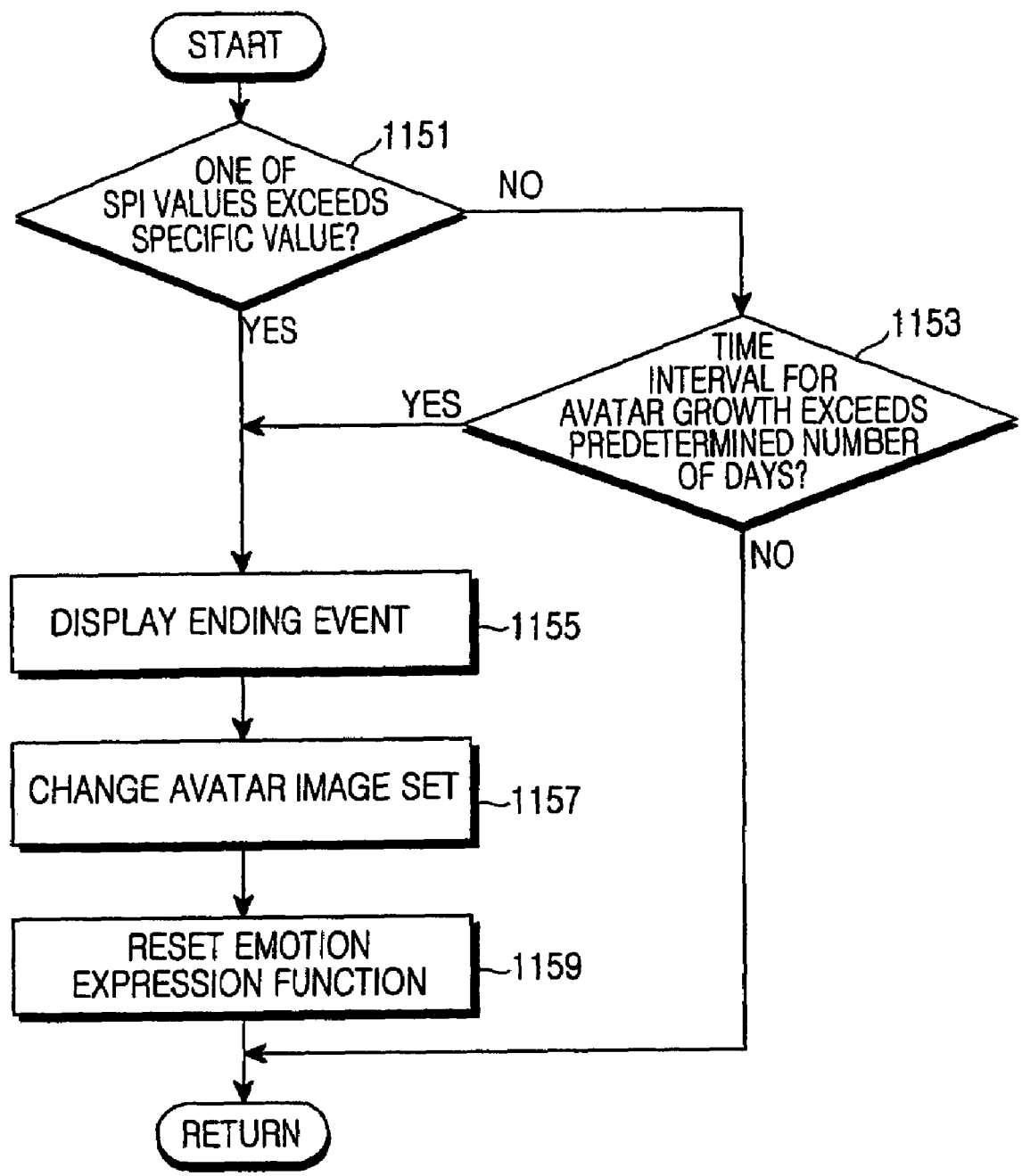
FIG. 24 is a flowchart of a process for initializing operation of the character emotion model at the ending status according to an embodiment of the present invention.

When it is time to end the growth of the avatar, the controller 110 detects it in step 729 and ends the process of growing the avatar by performing the process as shown in FIG. 24 in step 731. FIG. 24 is a flowchart of a process according to an embodiment of the present invention, in which the controller 110 determines if it is time to end the growth of the avatar and displays an avatar animation expressing the ending of the growth when it is time to end the growth.

When one of the SPI values exceeds a preset value (1000 in the present embodiment) or when a preset number of days (100 days in the present embodiment) have passed from the first day of the avatar growth, the controller 110 detects it in (step 1151 or step 1153 and accesses an avatar animation and text expressing the ending of the avatar growth in the memory 130 and displays them on the display unit 140 in step 1155. The text expressing the ending of the avatar growth may be displayed on the display unit 140 in the manner as shown in FIGS. 14C and 14D. Also, the ending text may be selected from Table 14. As noted from Table 14, the ending text is determined based on the final SPI values. Specifically, texts classified based on sense S, popularity P and Intelligence I, the SPI values are compared and analyzed, a text is selected based on the comparison and analysis, and the selected text is then displayed together with the ending animation as shown in FIGS. 14C and 14D.

Thereafter, the controller 110 selects a new avatar image set to be used for the next avatar growing event model in step 1157 and starts operation of the avatar growing event model in step 1159. In selecting the new avatar image set, the controller 110 selects an avatar image set which has been not used yet for the avatar growing event model. When there left no more avatar image set, either the avatar image set may be optionally selected by the user or the most recently used avatar image set may be selected.

According to the present invention as described above, use factors of the portable terminal can be expressed as emotion of the portable terminal through analysis of the use factors. For such expression, the present invention uses an avatar emotion expression event model and an avatar growing event model.

According to the present invention as described above, the portable terminal includes a table for allocating an emotion value to each event and avatar action models corresponding to the emotion state of the portable terminal. First, in the expression by the avatar emotion expression event model, the controller changes the emotion value based on the event by referring to the table. Then, at the time point for expression of the emotion, the controller analyzes the changed emotion value, determines the emotional state, and displays an avatar image corresponding to the emotion state. Here, the emotional state is considered as the emotional state of the portable terminal. Together with the avatar animation corresponding to the emotional state, a text corresponding to the emotional state may be selected and displayed.

The emotion value expressed by the avatar emotion expression event model can be revised. The revision of the emotion value can be either adopted or discarded. In the present invention, the emotion value can be revised based on a biorhythm index of a biorhythm model. Also, when the portable terminal has been unused during a predetermined time interval, the emotion value expressed by the avatar emotion expression event model can be reduced by a corresponding revision quantity. The present invention employs emotion state parameters including sense S, popularity P and intelligence I, to one of which a higher priority may be applied. In the above-mentioned embodiment of the present invention, a larger weight is applied to the sense.

While the avatar emotion expression event model expresses the changing emotion state of the portable terminal corresponding to the emotion value based on the use of the portable terminal, the avatar growing event model can change the growth status of the avatar based on the emotion value. That is, when the sum of the emotion values exceeds a preset value, the level of the avatar growing event model is shifted and the level shift is displayed by change of the avatar image set. In relation to the avatar growing event model, when the emotion value exceeds a preset value or when the time interval during which the avatar has grown exceeds a preset number of days, the growth of the avatar is ended and a new growing event model may be operated.

In the present invention as described above, the emotion value is changed according to the use factors of the portable terminal using an avatar UI, the emotional state of the portable terminal is confirmed by analyzing the emotion value, and an avatar image corresponding to the confirmed emotional state is then displayed on a screen. Therefore, the user of the portable terminal can visually confirm the status of the portable terminal. At the time point of expressing the avatar emotion, a text corresponding to an event having largest influence on the emotional state of the portable terminal is displayed, so that the user can confirm the event which the user most frequently utilizes or the user's habit of using the portable terminal. Also, in changing the avatar emotion value, the emotion value may be revised in order to effectively express an actual emotion state of the portable terminal, thereby enhancing the reliability on the expressed emotional state of the portable terminal. The growth of the avatar based on the result of the expression by the emotion expression event model enables the user to constantly confirm the growth state of the avatar visually.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for displaying a status of a portable terminal, the apparatus comprising:
   an emotion value memory for storing emotion variance values allocated to events occurring in a portable terminal;
   a character memory for storing character images which express a plurality of emotional states associated with operational states of the portable terminal;
   a controller for confirming an event variance value corresponding to an event when the event occurs in the portable terminal affecting at least one of the operational state of the portable terminal, changing an emotion value associated with the at least one of the operational states of the portable terminal by using the event variance value, confirming an emotional state corresponding to the emotion value, and selecting a character image corresponding to the confirmed emotional state from the character memory; and
   a display unit for displaying the selected character image as the emotional state indicative of the at least one operational state of the portable terminal.

2. The apparatus as claimed in claim 1, further comprising a text memory for storing texts which express the emotional states, wherein the controller selects the character image from the character memory and a text corresponding to the character image from the text memory, so that the display unit displays the selected character image and text.

3. The apparatus as claimed in claim 2, wherein the character memory is an avatar memory for storing avatar images and stores an affirmative avatar image set for performing an avatar animation expressing an affirmative emotional state, a normal avatar image set for performing an avatar animation expressing a normal emotional state, and a negative avatar image set for performing an avatar animation expressing a negative emotion state.

4. The apparatus as claimed in claim 3, wherein the affirmative avatar image set stored in the avatar memory includes avatar images showing an emotional state of extreme joy and avatar images showing an emotional state of happiness, and the negative avatar image set includes avatar images showing an emotional state of worry and avatar images looking sad.

5. The apparatus as claimed in claim 2, wherein the text memory includes at least one text corresponding to each of the emotional states.

6. The apparatus as claimed in claim 2, wherein the text memory includes a character text memory for storing texts which express character emotions corresponding to the emotional states and an event text memory for storing texts which express event emotions corresponding to the emotional states.

7. The apparatus as claimed in claim 2, wherein the emotion value memory stores emotion variance parameters allocated to each of the events, the emotion variance parameters including parameters of sense, popularity and intelligence.

8. The apparatus as claimed in claim 2, wherein the controller calculates a sum of the emotion value accumulated up to a current time point at which the emotion is expressed, calculates a difference between the sum of the emotion value and a previous sum of the emotion value calculated at a previous time point for expression of the emotion, and determines the emotional state indicative of the at least one operational state of the portable terminal as affirmative, normal or negative based on the difference.

9. The apparatus as claimed in claim 8, wherein, when the controller expresses the emotional state, the controller selects and displays an avatar image and text corresponding to the emotional state from the avatar memory and the text memory, and the controller alternately selects and displays a character emotion expression text and an event emotion expression text of an event having a largest influence on the emotional state indicative of the at least one operational state of the portable terminal in selecting the text.

10. An apparatus for displaying a status of a portable terminal, the apparatus comprising:
an emotion value memory for storing emotion variance values allocated to events occurring in a portable terminal affecting operational states of the portable terminal;
a character memory for storing character image sets each of which includes character images expressing at least one emotional state associated with at least one of the operational states of the portable terminal;
a biorhythm memory for storing biorhythm values and revision biorhythm values, each of the biorhythm values being calculated each day based on a biorhythm of at least one of the character images, the revision biorhythm value being calculated based on the biorhythm value and used in revising at least one of the emotion variance values;
a controller for confirming an event variance value corresponding to an event when the event occurs in the portable terminal affecting at least one of the operational states of the portable terminal, revising an emotion value associated with at least one of the operational states of the portable terminal by using the revision biorhythm value, confirming an emotional state corresponding to the emotion value, and selecting a character image corresponding to the confirmed emotional state from the character memory; and
a display unit for displaying the selected character image as the emotional state indicative of the at least one operational state of the portable terminal.

11. The apparatus as claimed in claim 10, further comprising a text memory for storing texts which express the emotional states, wherein the controller selects the character image from the character memory and a text corresponding to the character image from the text memory, so that the display unit displays the selected character image and text.

12. The apparatus as claimed in claim 11, wherein the controller automatically reduces and revises the emotion value when an event changing the emotion value does not occur during a time interval.

13. The apparatus as claimed in claim 11, wherein the emotion value memory stores emotion variance parameters allocated to each of the events, the emotion variance parameters including parameters of sense, popularity and intelligence.

14. The apparatus as claimed in claim 13, wherein the sense is provided with a larger weight than that for the popularity and the intelligence in the emotion value memory.

15. An apparatus for displaying a status of a portable terminal, the apparatus comprising:
an emotion value memory for storing emotion variance values allocated to events occurring in a portable terminal affecting operational states of the portable terminal;
a character memory for storing at least two character image sets each of which includes character images expressing a plurality of emotional states associated with the operation states of the portable terminal;
a growing event memory for storing a level shift threshold value for level shift and a growing event ending threshold value for ending growth of the character images;
a controller for changing an emotion value associated with at least one of the operational states of the portable terminal in the emotion value memory based on an event occurring in the portable terminal affecting at least one of the operational states of the portable terminal, determining an emotional state corresponding to the emotion value at a time point for expression of the emotion, selecting a character image corresponding to the confirmed emotional state from the character memory, replacing a current character image set by a new character image set when the emotion value exceeds the level shift threshold value, and initializing the emotion value and ending the growth of the character when the emotion value exceeds the growing event ending threshold value; and
a display unit for displaying the selected character image as the emotional state indicative of the at least one operational state of the portable terminal.

16. The apparatus as claimed in claim 15, further comprising a text memory for storing texts which express the emotional states, wherein the controller selects the character image from the character memory and a text corresponding to the character image from the text memory, so that the display unit displays the selected character image and text.

17. A method for displaying a status of a portable terminal, the method comprising:
changing an emotion value associated with at least one of operational states of a portable terminal based on an emotion variance value corresponding to an event occurring in the portable terminal affecting at least one of the operational states of the portable terminal;
determining an emotional state associated with the at least one of the operational states of the portable terminal based on the emotion value at a time point for expression of an emotion; and
expressing the emotional state by selecting a character image corresponding to the emotional state and displaying the character image as the emotional state indicative of the at least one operational state of the portable terminal.

18. The method as claimed in claim 17, wherein, the expressing of the emotional state comprises selecting the character image corresponding to the emotional state, and displayed the selected character image together with a text message corresponding to the character image.

19. The method as claimed in claim 18, wherein the character image is an avatar image in an avatar image set which includes affirmative avatar images for performing an avatar animation expressing an affirmative emotional state, normal avatar images for performing an avatar animation expressing a normal emotional state, and negative avatar images for performing an avatar animation expressing a negative emotion state.

20. The method as claimed in claim 19, wherein the affirmative avatar images include avatar images showing an emotional state of extreme joy and avatar images showing an emotional state of happiness, and the negative avatar images include avatar images showing an emotional state of worry and avatar images showing an emotional state of sadness.

21. The method as claimed in claim 17, wherein the emotion value has emotion variance parameters of sense, popularity and intelligence, each of which is allocated to an event occurring in the portable terminal, and the changing of the emotion value comprises:
changing an emotion variance parameter of sense when the event affecting the at least one of the operational states of the portable terminal is an event requiring change in an emotion value of sense;
changing an emotion variance parameter of popularity when the event affecting the at least one of the operational states of the portable terminal is an event requiring change in an emotion value of popularity; and
changing an emotion variance parameter of intelligence when the event affecting the at least one of the operational states of the portable terminal is an event requiring change in an emotion value of intelligence.

22. The method as claimed in claim 21, wherein the expressing of the emotional state comprises:
calculating a total emotion value at a current time point at which the emotion is expressed, calculating a difference between the total emotion value of the current time point and a previous total emotion value calculated at a previous time point for expression of the emotion, and determining the emotional state based on the difference;
determining an avatar image based on the determined emotional state; and
displaying the avatar image as the emotional state.

23. The method as claimed in claim 17, wherein the expressing of the emotional state comprises:
calculating a total emotion value at a current time point at which the emotion is expressed, calculating a difference between the total emotion value of the current time point and a previous total emotion value calculated at a previous time point for expression of the emotion, and determining the emotional state based on the difference;
determining an avatar image and a text based on the determined emotional state; and
displaying the avatar image and the text as the emotional state.

24. The method as claimed in claim 17, wherein the expressing of the emotional state comprises:
calculating a total emotion value at a current time point at which the emotion is expressed, calculating a difference between the total emotion value of the current time point and a previous total emotion value calculated at a previous time point for expression of the emotion, and determining the emotional state based on the difference;
determining an avatar image based on the determined emotional state;
determining a text based on the determined emotional state or a text corresponding to an event having a largest influence on the emotional state; and
displaying the avatar image and the text as the emotional state, wherein
the determined text includes a character emotion expression text and an event emotion expression text which are alternately selected and displayed.

25. A method for displaying a status of a portable terminal, the method comprising:
changing an emotion value associated with at least one of operational states of a portable terminal based on an emotion variance value corresponding to an event occurring in the portable terminal affecting at least one of the operational states of the portable terminal and revising the changed emotion value by using a biorhythm value;
determining an emotional state associated with the at least one of the operational states of the portable terminal by analyzing the emotion value at a time point for expression of emotion; and
expressing the emotional state by selecting a character image corresponding to the emotional state and displaying the character image as the emotional state of the plurality of the emotional states indicative of the at least one operational state of the portable terminal.

26. The method as claimed in claim 25, wherein, the expressing of the emotional state comprises selecting the character image corresponding to the emotional state, and displayed the selected character image together with a text message corresponding to the character image.

27. The method as claimed in claim 26, wherein, the changing of the emotion value comprises automatically reducing and revising the emotion value when an event changing the emotion value does not occur during a time interval.

28. The method as claimed in claim 26, wherein the changing of the emotion value comprises:
changing an emotion variance parameter of sense when the event affecting the at least one of the operational states of the portable terminal is an event requiring change in an emotion value of sense;

changing an emotion variance parameter of popularity when the event affecting the at least one of the operational states of the portable terminal is an event requiring change in an emotion value of popularity; and changing an emotion variance parameter of intelligence when the event affecting the at least one of the operational states of the portable terminal is an event requiring change in an emotion value of intelligence.

29. The method as claimed in claim 26, wherein the biorhythm value includes a sensitivity index, a physical index and an intelligence index, and the changing of the emotion value comprises:

determining revised biorhythm indexes by comparing biorhythm indexes with preset threshold values every day; and revising the emotion value by using the revised biorhythm indexes.

30. The method as claimed in claim 26, wherein the character image is an avatar image in an avatar image set which includes affirmative avatar images for performing an avatar animation expressing an affirmative emotional state, normal avatar images for performing an avatar animation expressing a normal emotional state, and negative avatar images for performing an avatar animation expressing a negative emotional state.

31. The method as claimed in claim 30, wherein the expressing of the emotional state comprises:

calculating a total emotion value at a current time point at which the emotion is expressed, calculating a difference between the total emotion value of the current time point and a previous total emotion value calculated at a previous time point for expression of the emotion, and determining the emotional state of as affirmative, normal or negative based on the difference;

determining an avatar image based on the determined emotional state; and displaying the avatar image as the emotional state.

32. The method as claimed in claim 30, wherein the expressing of the emotional state of the portable terminal comprises:

calculating a total emotion value at a current time point at which the emotion is expressed, calculating a difference between the total emotion value of the current time point and a previous total emotion value calculated at a previous time point for expression of the emotion, and determining the emotional state as affirmative, normal or negative based on the difference;

determining an avatar image and a text based on the determined emotional state; and displaying the avatar image and the text as the emotional state.

33. The method as claimed in claim 30, wherein the expressing of the emotional state comprises:

calculating a total emotion value at a current time point at which the emotion is expressed, calculating a difference between the total emotion value of the current time point and a previous total emotion value calculated at a previous time point for expression of the emotion, and determining the emotional state as affirmative, normal or negative based on the difference;

determining an avatar image based on the determined emotional state;

determining a text based on the determined emotional state or a text corresponding to an event having a largest influence on the emotional state; and displaying the avatar image and the text as the emotional state, wherein the determined text includes a character emotion expression text and an event emotion expression text which are alternately selected and displayed.

34. A method for displaying a status of a portable terminal, the method comprising:

changing an emotion value associated with at least one of operational states of a portable terminal based on an emotion variance value corresponding to an event occurring in the portable terminal affecting at least one of the operational states of the portable terminal;

determining an emotional state associated with the at least one of the operational states of the portable terminal based on the emotion value at a time point for expression of emotion, selecting a character image corresponding to the emotional state, and displaying the character image;

comparing the emotion value with a level shift threshold value and performing a level shift by replacing a current character image set by a new character image set and displaying a level shift message when the level shift is necessary; and comparing the emotion value with a growing event ending threshold value and initializing the emotion value and preparing another character image set for a new process of expressing emotion when the ending of a growing event is necessary.

35. The method as claimed in claim 34, wherein the character image is an avatar image in an avatar image set which includes affirmative avatar images for performing an avatar animation expressing an affirmative emotional state, normal avatar images for performing an avatar animation expressing a normal emotional state, and negative avatar images for performing an avatar animation expressing a negative emotional state.

36. The method as claimed in claim 34, wherein, the changing of the emotion value comprises automatically reducing and revising the emotion value when an event affecting the at least one of the operational states of the portable terminal and indicative of changing of the emotion value does not occur during a time interval.

37. The method as claimed in claim 34, wherein the emotion value has emotion variance parameters of sense, popularity and intelligence, each of which is allocated to an event occurring in the portable terminal, and the changing of the emotion value comprises:

changing an emotion variance parameter of sense when the event affecting the at least one of the operational states of the portable terminal is an event requiring change in an emotion value of sense;

changing an emotion variance parameter of popularity when the event affecting the at least one of the operational states of the portable terminal is an event requiring change in an emotion value of popularity; and changing an emotion variance parameter of intelligence when the event affecting the at least one of the operational states of the portable terminal is an event requiring change in an emotion value of intelligence.

38. The method as claimed in claim 34, wherein the biorhythm value includes a sensitivity index, a physical index and an intelligence index, and the changing of the emotion value comprises:

determining revised biorhythm indexes by comparing biorhythm indexes with threshold values every day; and revising the emotion value by using the revised biorhythm indexes.

39. The method as claimed in claim 34, wherein the expressing of the emotion comprises:

calculating a total emotion value at a current time point at which the emotion is expressed, calculating a difference between the total emotion value of the current time point and a previous total emotion value calculated at a previous time point for expression of the emotion, and determining the emotional state as affirmative, normal or negative based on the difference;

determining an avatar image based on the determined emotional state; and displaying the avatar image as the emotional state indicative of the at least one operational state of the portable terminal.

40. The method as claimed in claim 34, wherein the expressing of the emotion comprises:

calculating a total emotion value at a current time point at which the emotion is expressed, calculating a difference between the total emotion value of the current time point and a previous total emotion value calculated at a previous time point for expression of the emotion, and determining the emotional state as affirmative, normal or negative based on the difference;

determining an avatar image and a text based on the determined emotional state; and displaying the avatar image and the text as the emotional state indicative of the at least one operational state of the portable terminal.

41. The method as claimed in claim 34, wherein the expressing of the emotion comprises:

calculating a total emotion value at a current time point at which the emotion is expressed, calculating a difference between the total emotion value of the current time point and a previous total emotion value calculated at a previous time point for expression of the emotion, and determining the emotional state as affirmative, normal or negative based on the difference;

determining an avatar image based on the determined emotional state;

determining a text based on the determined emotional state or a text corresponding to an event having largest influence on the emotional state; and displaying the avatar image and the text as the emotional state indicative of the at least one operational state of the portable terminal, wherein the determined text includes a character emotion expression text and an event emotion expression text which are alternately selected and displayed.

42. The method as claimed in claim 34, wherein the performing of the level shift comprises:

comparing the emotion value with a level shift threshold value;

displaying an affirmative avatar image together with a text expressing a level up, replacing a current avatar image set by a new avatar image set of a changed level, and then returning to a process of changing the emotion value, when the emotion value is larger than the level shift threshold value; and displaying a negative avatar image together with a text expressing a level down, replacing a current avatar image set by a new avatar image set of a changed level, and then returning to the process of changing the emotion value, when the emotion value is smaller than the level shift threshold value.

* * * * *